(12) United States Patent
Hay et al.

(10) Patent No.: US 7,020,663 B2
(45) Date of Patent: Mar. 28, 2006

(54) SYSTEM AND METHOD FOR THE DELIVERY OF ELECTRONIC BOOKS

(75) Inventors: George M. Hay, 2436 N. Federal Hwy., Suite 375, Lighthouse Point, FL (US) 33064; Gerald Rasmussen, Ft. Lauderdale, FL (US)

(73) Assignee: George M. Hay, Lighthouse Point, FL (US)

( * ) Notice: Subject to any disclaimer, the term of this patent is extended or adjusted under 35 U.S.C. 154(b) by 590 days.

(21) Appl. No.: 10/067,976

(22) Filed: Feb. 8, 2002

(65) Prior Publication Data

US 2002/0184189 A1    Dec. 5, 2002

Related U.S. Application Data

(60) Provisional application No. 60/294,439, filed on May 30, 2001.

(51) Int. Cl.
*G06F 17/30* (2006.01)
(52) U.S. Cl. .................. 707/104.1; 707/102; 707/1
(58) Field of Classification Search ................ 412/1; 713/1; 715/526, 500.1; 345/727; 704/260
See application file for complete search history.

(56) References Cited

U.S. PATENT DOCUMENTS

| | | |
|---|---|---|
| 5,417,575 A | 5/1995 | McTaggart |
| 5,477,510 A | 12/1995 | Ukita |
| 5,500,919 A | 3/1996 | Luther |
| 5,534,888 A | 7/1996 | Lebby et al. |
| 5,572,625 A | 11/1996 | Raman et al. |
| 5,575,659 A | 11/1996 | King et al. |
| 5,663,748 A | 9/1997 | Huffman et al. |
| 5,687,144 A | 11/1997 | Nishizawa |
| 5,697,793 A | 12/1997 | Huffman et al. |
| 5,749,735 A | 5/1998 | Redford et al. |
| 5,758,320 A | 5/1998 | Asano |
| 5,761,485 A | 6/1998 | Munyan |
| 5,769,642 A | 6/1998 | Shinohara |
| 5,820,379 A | 10/1998 | Hall et al. |
| 5,822,284 A | 10/1998 | Nishizawa |
| 5,850,629 A | 12/1998 | Holm et al. |

(Continued)

FOREIGN PATENT DOCUMENTS

JP    59-178639    9/1984

(Continued)

OTHER PUBLICATIONS

Daisy Consortium . . . a better way to read (http://www.daisy.org), 2 pages, printed Oct. 30, 2003.

(Continued)

*Primary Examiner*—Jeffrey Gaffin
*Assistant Examiner*—Neveen Abel-Jalil
(74) *Attorney, Agent, or Firm*—Stephen B. Parker, Esq.

(57) ABSTRACT

An electronic book on a computer readable medium, e.g., a CD or the like, has "real-life" pre-recorded audio (preferably, in MP3 format) and visual text (preferably, in RTF format) seamlessly linked together via a linking file (preferably, in XML format) such that a reader can switch back and forth "at will" between visually reading on a computer display screen and/or listening to the book being read aloud by an actual narrator. The computer readable medium includes a reader program installed thereon and an automatic installation program. A novel process for creating the electronic book includes a creator program that may have a similar graphical user interface to the reader program. The electronic book may combine advantages of physical hardcover books with new e-reading functionality developed by the present inventor.

24 Claims, 23 Drawing Sheets

System A

U.S. PATENT DOCUMENTS

Figure 2:
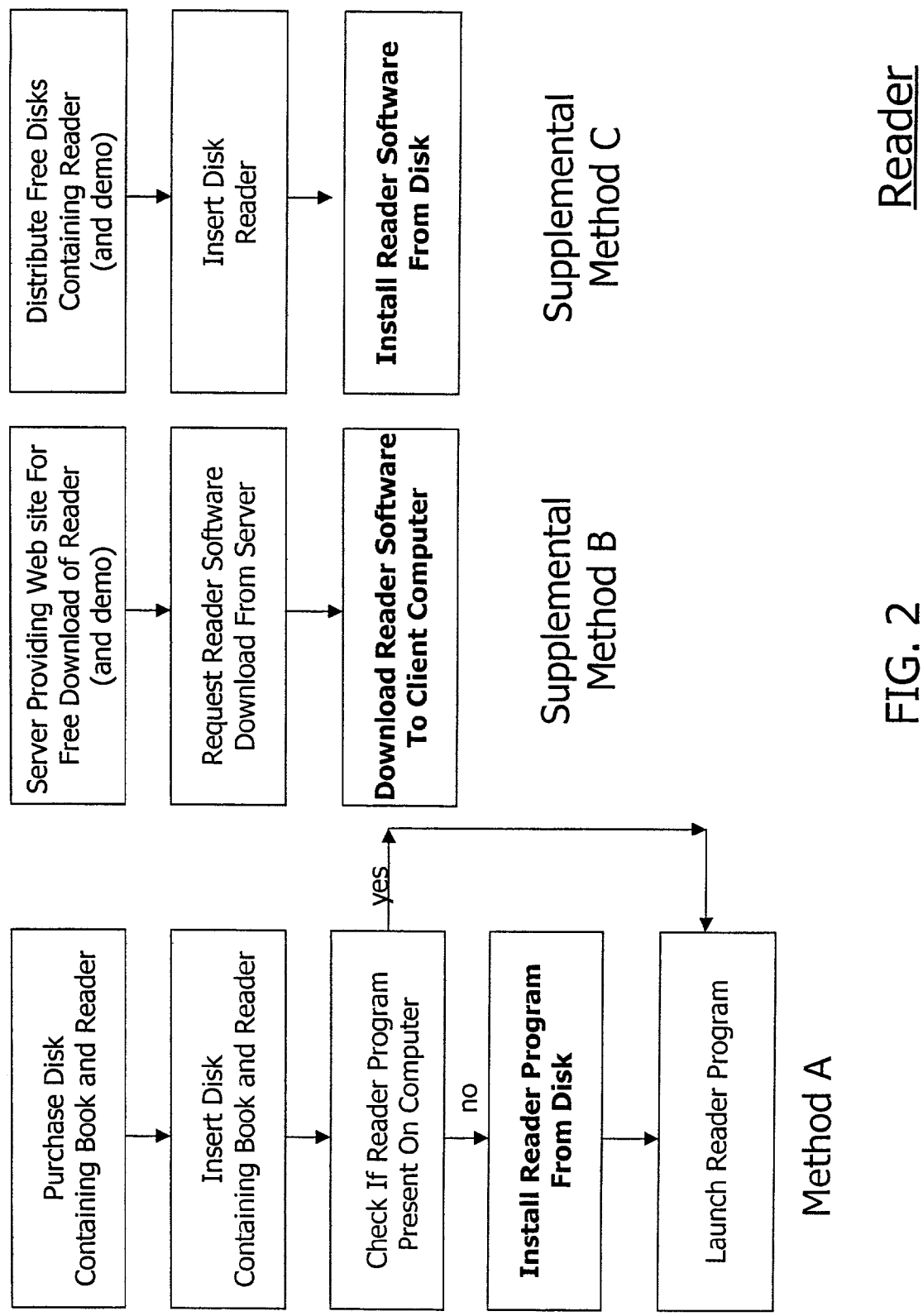

| | | | |
|---|---|---|---|
| 5,864,814 | A | 1/1999 | Yamazaki |
| 5,890,117 | A | 3/1999 | Silverman |
| 5,893,132 | A | 4/1999 | Huffman et al. |
| 5,897,324 | A | 4/1999 | Tan |
| 5,903,867 | A | 5/1999 | Watari et al. |
| 5,957,697 | A | 9/1999 | Iggulden et al. |
| 5,986,690 | A | 11/1999 | Hendricks |
| 5,991,594 | A | 11/1999 | Froeber et al. |
| 6,052,663 | A | 4/2000 | Kurzweil et al. |
| 6,056,551 | A | 5/2000 | Marasco |
| 6,064,380 | A | 5/2000 | Swenson et al. |
| 6,076,060 | A | 6/2000 | Lin et al. |
| 6,081,780 | A | 6/2000 | Lumelsky |
| 6,142,721 | A * | 11/2000 | Marsh .................. 412/1 |
| 6,154,757 | A | 11/2000 | Krause et al. |
| 6,154,835 | A * | 11/2000 | Chrabaszcz et al. ......... 713/1 |
| 6,205,427 | B1 | 3/2001 | Itoh et al. |
| 6,243,676 | B1 | 6/2001 | Witteman |
| 6,324,511 | B1 * | 11/2001 | Kiraly et al. ............. 704/260 |
| 2002/0054073 | A1 * | 5/2002 | Yuen .................. 345/727 |
| 2002/0087555 | A1 | 7/2002 | Murata |
| 2002/0116421 | A1 * | 8/2002 | Fox et al. ................. 707/526 |
| 2003/0018663 | A1 * | 1/2003 | Cornette et al. ......... 707/500.1 |

FOREIGN PATENT DOCUMENTS

| | | |
|---|---|---|
| JP | 02-309390 | 12/1990 |
| JP | 06-308992 | 4/1994 |
| JP | 62515171 | 9/1994 |
| JP | 9265470 | 10/1997 |
| JP | 10011468 | 1/1998 |
| JP | 2000112857 | 4/2000 |
| WO | WO 9710541 | 3/1997 |

OTHER PUBLICATIONS

Dolphin Audio Publishing, Solutions for the digital authoring age (http://www.dolphinse.com/index_eng.htm), 2 pages, printed Oct. 30, 2003.

Copyright Industry Canada, Digitization of the Book: A Report on Present Trends, see (http://www.schoolnet.ca), printed Sep. 5, 2001.

Dennis P. Devendra/Features and Benefits for the Interface of the Next Generation Digital Talking Book, Feb. 28, 1998.

ZD Net Downloads, Text to $Mp^3$ (http://www.zdnet.com), Jul. 5, 2001.

B.T. Kimbrough/Daisy on Our Desktops? A Review of LpPlayer 2.4 (http://www.rit.edu.com), printed Aug. 30, 2001.

Sheryl L. Day and Barbara J. Edwards/Assistive Technology for Postsecondary Students with Learning Disabilities/ Journal of Learning Disabilities 29(5): 486-492 (http://www.rid.org), 1996.

Your Computer Will Talk to You, About.com (http://www.about.com), printed Aug. 30, 2001.

International Search Report, Application No. PCT/US02/16965 dated Sep. 15, 2002.

Dolphin Audio Publishing, "Synchronized Text And Audio Reader (STAR)," (http://www.dolphinuk.co.uk/audio/products/star/index.htm), 2 pages, printed Jul. 26, 2004.

* cited by examiner

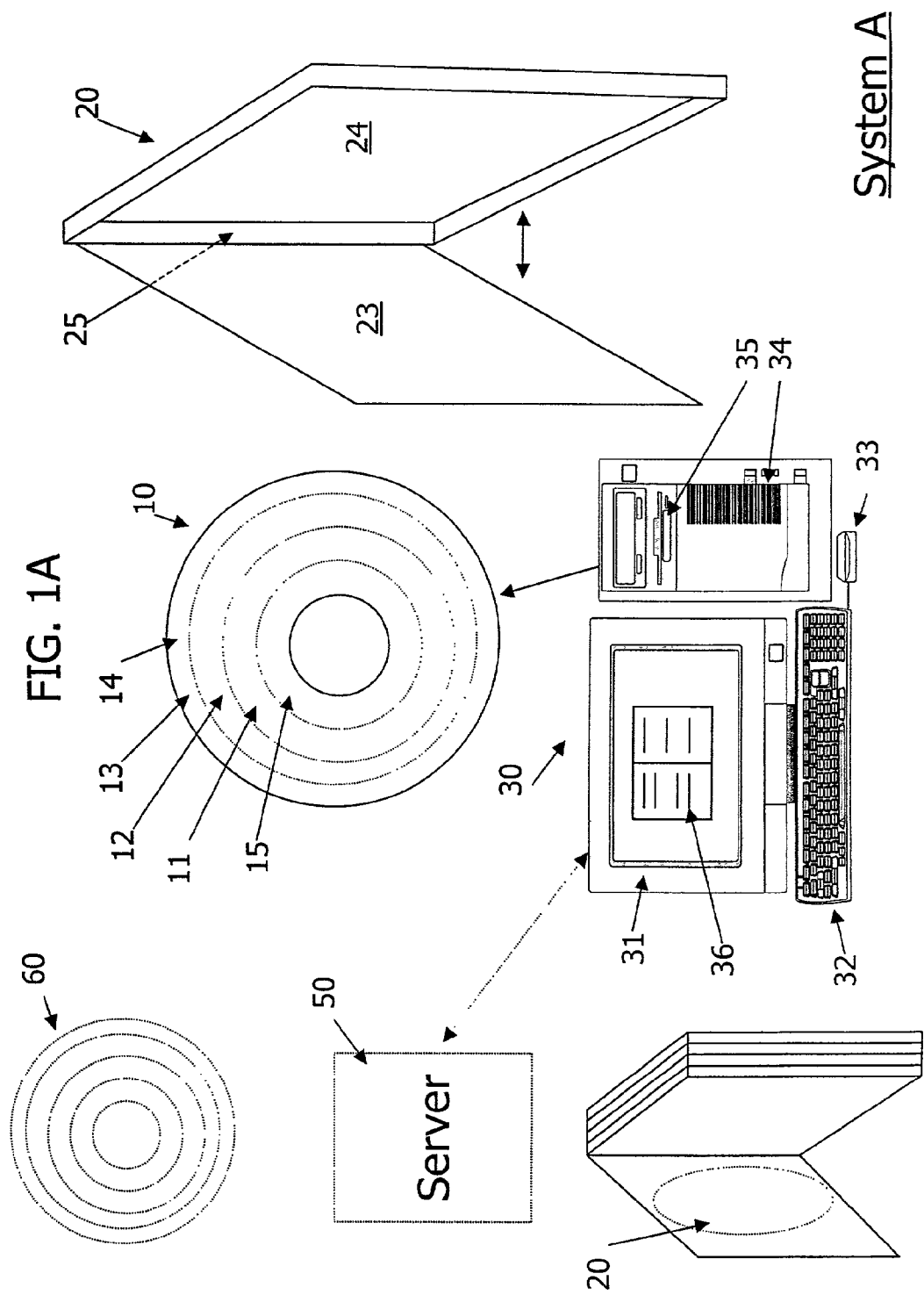

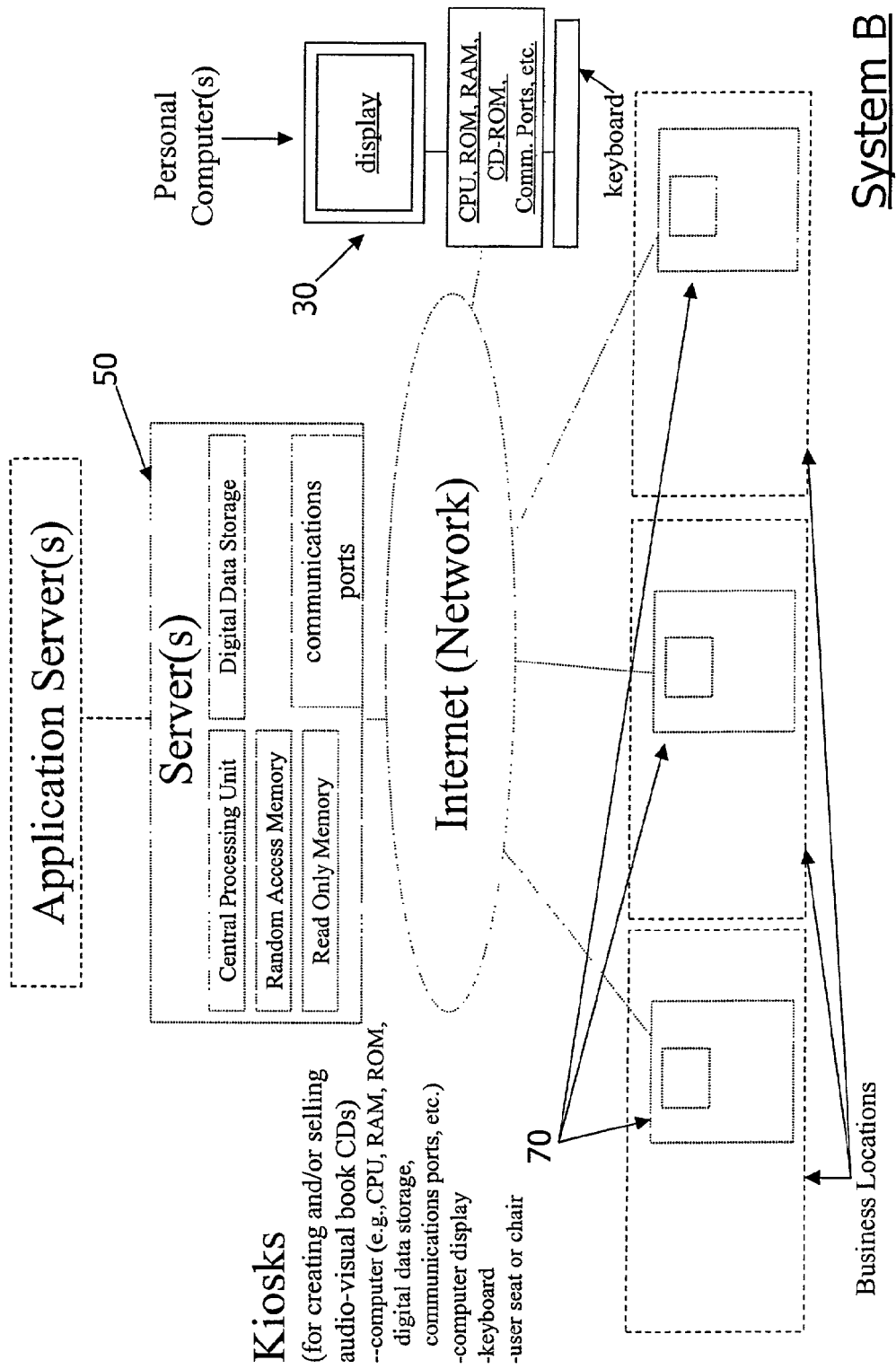

FIG. 1C
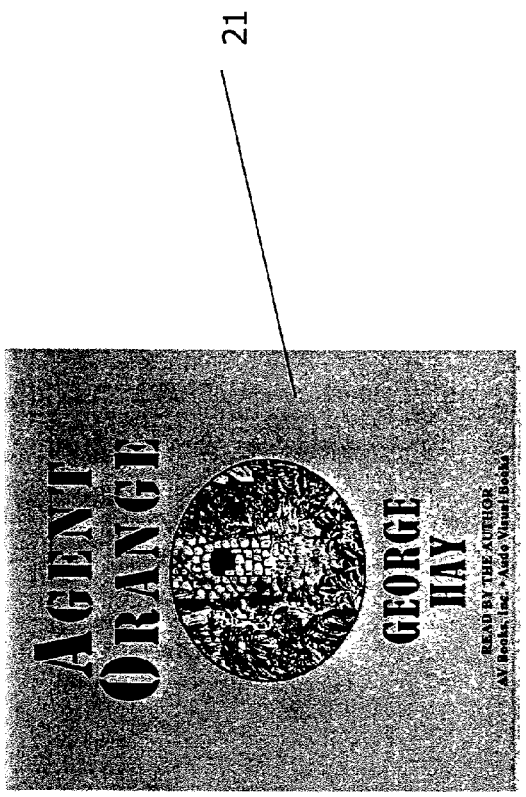
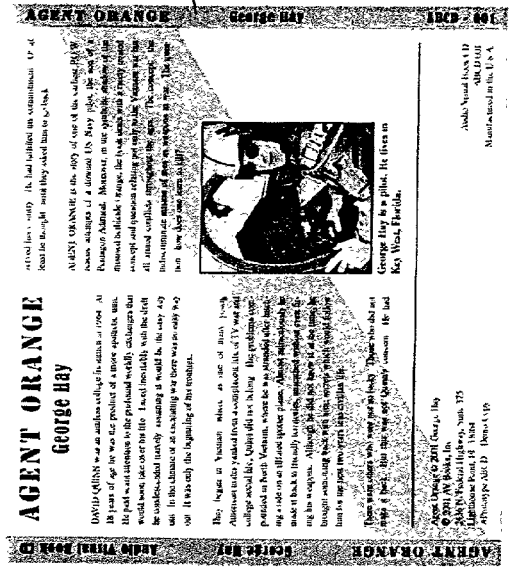

Book XML File

```xml
<AVBook lastID="521" filename="">

<Package Title="untitled" Author="" Publisher="" Copyright="" Output_Name="unknown.avb" Description="" Narration_Details="" Notes="" Title_Image_Path="D:\_Code\_Projects\AVBooks\Books\Harry Potter Cover.jpg" filename=""/>

<Document id="id1" name="Section One.rtf" filename="D:\_Code\_Projects\AVBooks\Books\Harry\Section One.rtf"/>

<Book>

<Section id="id25" name="Reader Intro" audio_file="id51" filename="Section One.rtf">
      <Sentence start_pos="0" length="11" id="id449" audio_file="id51" start_time="3.652417" filename="Section One.rtf"/>
      <Sentence start_pos="16" length="17" id="id450" audio_file="id51" start_time="7.441496" filename="Section One.rtf"/>
    </Section>

<Section id="id67" name="Gragment 1" audio_file="id91" filename="Section One.rtf">
      <Sentence start_pos="35" length="123" id="id84" audio_file="id91" start_time="0" end_time="112.19565" filename="Section One.rtf"/>
    </Section>

<Section id="id454" name="Unknown" audio_file="id488">
      <Sentence start_pos="0" length="14" id="id484" audio_file="id488" start_time="0.4952914"/>
      <Sentence start_pos="16" length="19" id="id485" audio_file="id488" start_time="1.3831514"/>
      <Sentence start_pos="39" length="143" id="id490" audio_file="id488" start_time="3.2854744"/>
      <Sentence start_pos="183" length="105" id="id491" audio_file="id488" start_time="14.2949049"/>
    </Section>

<AudioFiles>
      <AudioFile id="is47" name="Musical Intro" filename="D:\_Code\_Projects\AVBooks\Books\Harry\Intro.1.mp3"/>
      <AudioFile id="id51" name="Reader Intro" filename="D:\_Code\_Projects\AVBooks\Books\Harry\Intro.2.mp3"/>
      <AudioFile id="id91" name="Fragment 1" filename="D:\_Code\_Projects\AVBooks\Books\Harry\Paragraph 1.mp3"/>
      <AudioFile id="id434" name="Fragment 2" filename="D:\_Code\_Projects\AVBooks\Books\Harry\Paragraph 2.mp3"/>

</Book>
</AVBook>
```

FIG. 3B

```xml
<AVBooks curHighlightColor="65280" lastID="8">
    <Book>
        <FinalBookmark SentenceId="id29"/>
        <Bookmarks>
            <Bookmark SentenceId="id45"/>
            <Bookmark SentenceId="id486"/>
        </Bookmarks>
        <Annotations>
            <Annotation SentenceId="id45"/>
            <Annotation SentenceId="id486"/>
        </Annotations>
        <Highlights>
            <Highlight HighlightId="id0" HighlightColor="65535" start_pos="177" end_pos="226" hLength="49"/>
            <Highlight HighlightId="id1" HighlightColor="65535" start_pos="228" end_pos="309" hLength="81"/>
            <Highlight HighlightId="id2" HighlightColor="65535" start_pos="321" end_pos="525" hLength="204"/>
            <Highlight HighlightId="id5" HighlightColor="65535" start_pos="321" end_pos="525" hLength="204"/>
            <Highlight HighlightId="id6" HighlightColor="65535" start_pos="528" end_pos="673" hLength="145"/>
            <Highlight HighlightId="id7" HighlightColor="65280" start_pos="714" end_pos="826" hLength="112"/>
        </Highlights>
    </Book>
</AVBooks>
```

Personal XML File

FIG. 3C

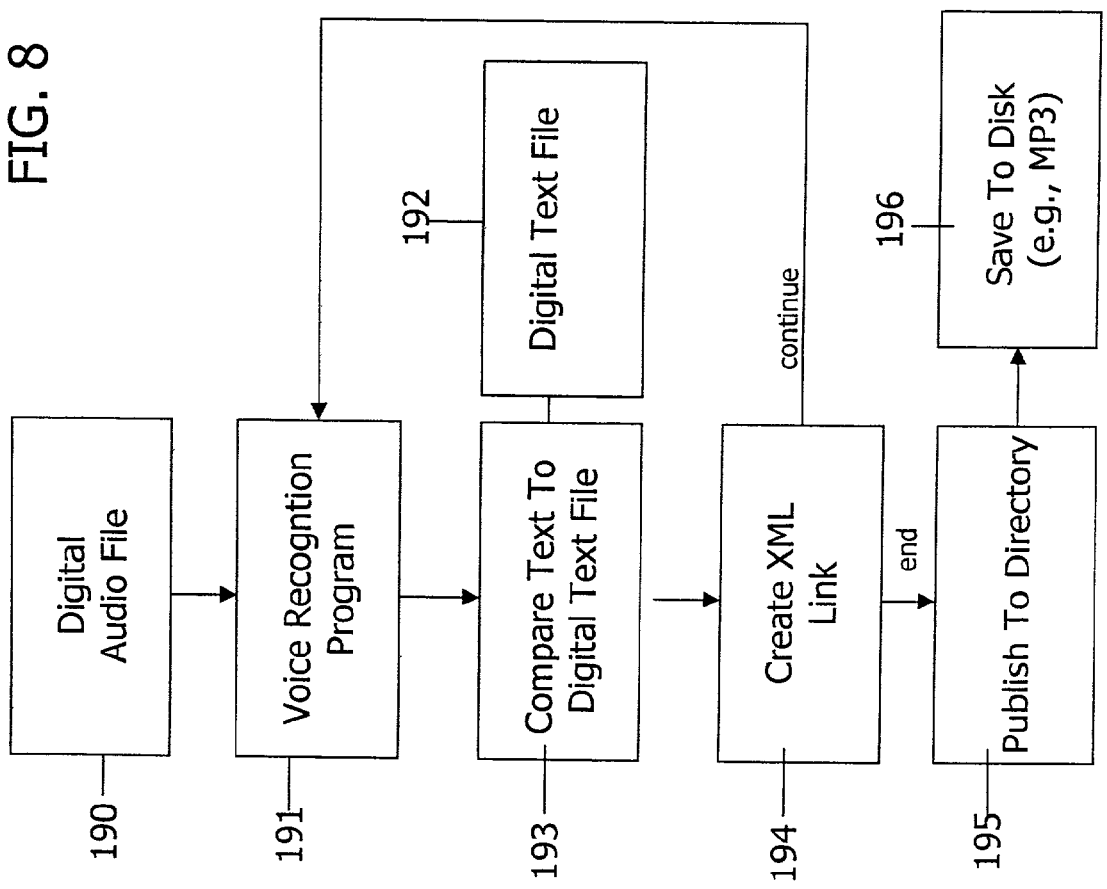

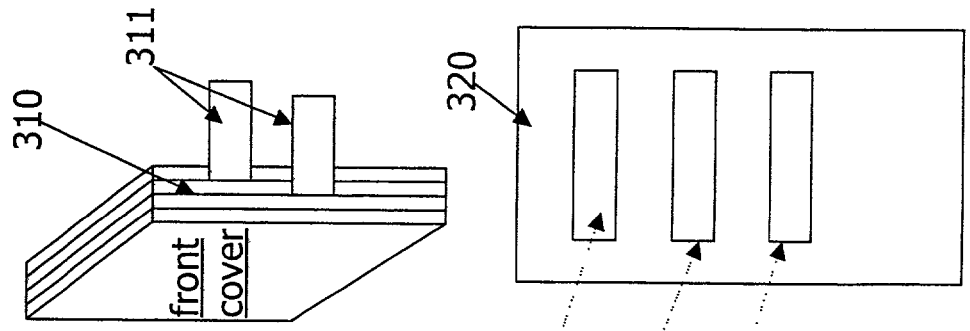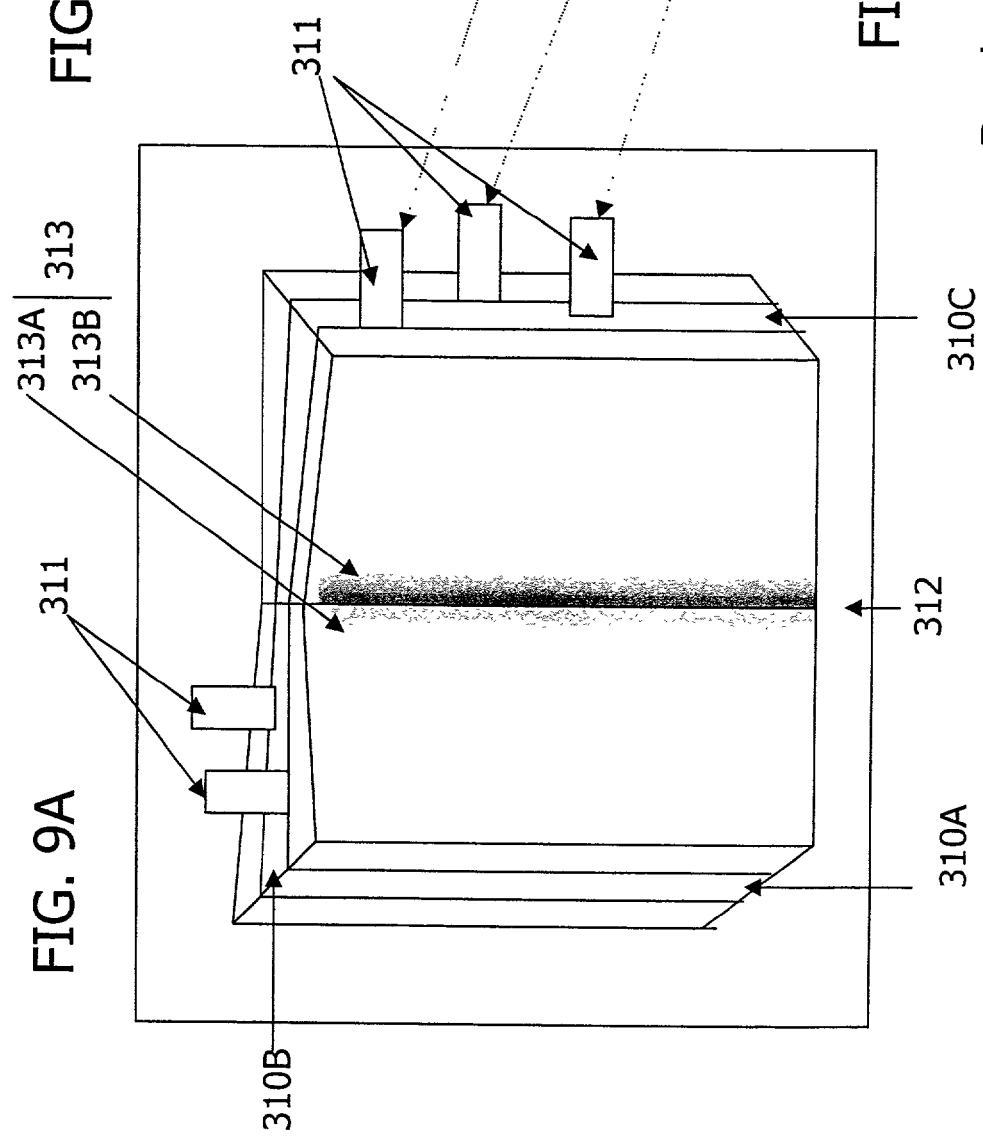

FIG. 18

SYSTEM AND METHOD FOR THE DELIVERY OF ELECTRONIC BOOKS

The present application claims priority to provisional application Ser. No. 60/294,439, filed on May 30, 2001, entitled System and Method for the Delivery of Electronic Books, the entire disclosure of which is incorporated herein in by reference in its entirety as though recited herein in full.

FIELD OF THE INVENTION

The present invention relates generally to the delivery of electronic books. The preferred embodiments of the present invention provide a system and method for delivering electronic books on a computer readable medium with a natural audio file (e.g., recorded "live" with a human narrator), an electronic text file and a book reader program.

INTRODUCTION

There is currently significant uncertainty in the electronic book and the traditional book markets. With the introduction of electronic books (e-books) and electronic digital reading software (e-book readers) and hardware, the market has been somewhat slow. There are a limited number of electronic versions of books published and a limited number of features associated with existing e-book reader software.

The traditional book market is well established and consumers are accustomed to traditional methods of reading. Despite the existence of e-books, consumers are set in their ways. With respect to reading, for example, consumers will require something unique to change their reading habits. Existing e-books can be complicated to use. They can require that the user be able to download e-books and associated e-book reader software from the Internet, presuming they have the ability (i.e., both knowledge and/or resources) and/or time.

Existing e-book reader software is often not very versatile and/or user friendly. Among other problems, the e-book market typically requires a substantial amount of cost and/or time associated with the purchase and/or download of an electronic book.

e-Book publishers are often required to produce their books in multiple e-book formats due to the number of different competing e-book reading formats on the market. Typically, consumers are required to purchase an e-book and then download it from the Internet, causing users unacceptable problems, delays and/or inconveniences.

Existing e-book digital reading software companies provide reader software with digital searching and personal library management tools. However, consumers have still been slow to move towards the e-book market. e-Books can have a number of problems including, for example, that: 1) there are a multiple number of e-book formats and no single industry standard; 2) there are limited books published in electronic format; 3) consumers are often required to download multiple e-book reader software programs; and/or 4) the reader software programs have restricted applicability, such as to certain computers and/or handheld devices.

With e-books authors can potentially publish books electronically and can, in essence, go directly to the public. That is, authors can potentially bypass "traditional" publishers and distributors. Authors and e-book publishers, however, are faced with pirating concerns, copyright issues and/or potential theft.

The present inventor has discovered that to a traditional reader, downloading e-books into a computer is simply not an acceptable substitute for the physical ownership of the hardback and/or paperback book and that this is likely a reason that e-book downloads have found little acceptance as an emerging technology. Moreover, traditional hardback and/or paperback books will likely remain in wide use for years to come. The present inventor has discovered that, among other things, what has been needed are methods of providing e-books that combines the physical ownership of a book product with an advanced technology that enhances educational and/or recreational reading and which methods integrate easily alongside traditional hardback and/or paperback book methods.

The present invention has significant advantages over other art, avoiding the above and/or other deficiencies, limitations and/or problems associated therewith, such as, for example, other art shown in: 1) U.S. Pat. No. 5,575,659; 2) U.S. Pat. No. 5,687,144; 3) U.S. Pat. No. 5,749,735; 4) U.S. Pat. No. 5,820,379; 5) U.S. Pat. No. 5,822,284; 6) U.S. Pat. No. 5,957,697; 7) U.S. Pat. No. 6,154,757; 8) Patent Cooperation Treaty Publication PCT WO/97/10541; 9) On-line Publication Entitled "Features and Benefits for the Interface of the Next Generation Digital Talking Book," by Dennis R. DeVendra; 10) On-line Publication Entitled "DAISY on Our Desktops? A Review of LpPlayer 2.4," by B. T. Kimbrough; and/or 11) On-line reference entitled "Digitization Of The Book: A Report of Present Trends."

SUMMARY OF THE PREFERRED EMBODIMENTS

A potential advantage of some embodiments of the present invention is the ability to present books electronically to readers in an increasingly user-friendly format.

Another potential advantage of some embodiments of the present invention is the ability to establish a more flexible standard for electronic book readers.

Another potential advantage of some embodiments of the present invention is the ability to permit a reader to read a book electronically or, upon selection, to have a book read orally to the reader.

Another potential advantage of some embodiments of the present invention is the ability to flexibly transition back and forth between reading an electronic book on screen and having a book read orally to a reader.

Another potential advantage of some embodiments of the present invention is the ability to permit highlighting of selectable sections of an electronic book by a reader.

Another potential advantage of some embodiments of the present invention is the ability to allow highlighted sections of an electronic book to be read back to a reader.

Another potential advantage of some embodiments of the present invention is the ability to allow book-marked sections of an electronic book to be printed for a reader.

Another potential advantage of some embodiments of the present invention is the ability to have a book read by a human voice rather than a computer-generated voice.

Another potential advantage of some embodiments of the present invention is the ability to allow electronic books played on common audio player devices.

The above and/or other advantages may, if desired, be provided in some preferred embodiments of the present invention as will be apparent to those skilled in the art based upon the present disclosure.

In preferred embodiments of the present invention, the number of books on a user's physical library room shelves can increase significantly due to the size of the media, which can be, in preferred embodiments, in a computer readable medium (e.g., CD) format. Among other things, the organization of shelves can be enhanced by the avoidance of size "variations" seen with hard-cover books. Preferably, the computer readable medium on which the book is digitally stored is housed within a container in which bound titles can still be visually observed and read as a user surveys a traditional library environment. As a result, the books may typically be thinner, making room for many more books on a user's once-cramped shelves. In short, the bound copies (e.g., containers for the computer readable mediums) can be thinner because they may contain little or no paper. In some embodiments, the container may include a paper insert. In preferred embodiments, the paper insert may include a front picture that is the same or substantially the same as that of the corresponding hard-cover book, a rear picture that is the same or substantially the same as that of the corresponding hard-cover book, and, if desired, one or more internal pages. The internal pages may include, for example, advertisement information, the preface or a prologue of the book, the table of contents of the book, information regarding the technical aspects of the computer readable medium (e.g., CD), how to use the book, customer service contact information, and/or other information. In preferred embodiments, the container includes a CD that can simply be removed and inserted into a computer (e.g., personal computer, laptop computer, handheld computer, etc.) or the like. Then, the user will be able to read and/or listen to an electronic book stored thereon, such as reading a favorite novel, studying a textbook assignment, etc., just as with hard copy paper books.

In preferred embodiments of the present invention, when the reader's eyes tire, the reader can instruct the laptop to read the book aurally and a human voice will read the text to the reader from the point where the instruction was given.

Preferably, if the reader is studying a textbook and desires to highlight sections and/or to take notes, the system of the present invention will allow the reader to highlight the text in both the visual and the audio-visual mode and/or to take notes related thereto. Preferably, the software will provide the option to review highlighting (or even note taking) by, for example, having the computer read back the specific portions that were highlighted.

With preferred embodiments of the present invention, users will not need to carry heavy textbooks (e.g., relieving the burdens of students and/or other users). In order to use preferred embodiments of the present invention, a user may, for example, only have access to a computer (e.g., a personal computer, a personal digital assistant, a laptop, etc.) and a selection of a CD or the like produced according to embodiments of the present invention. In this manner, physical "books" will be available, but in, for example, CD form, and will be readily available in a cost effective manner.

In preferred embodiments of the present invention, a new audio-visual book format can be provided. Unlike both a) audio-only books on tapes or CDs which only play on standard tapes or CD players and b) existing e-books which only allow users to read books electronically published on computers or handheld devices, the preferred embodiments of the present invention provide consumers with the ability to simultaneously read the books and/or listen to actual human voice narrations thereof.

In preferred embodiments, a computer readable medium (e.g., a CD or the like) contains a book reader program that uniquely provides a seamless link between a human-voice audio copy of the book with a digital text form of the book such that an individual can easily switch between reading and/or listening. Among other benefits, this can expediently increase the efficiency of reading. In the most preferred embodiments, the narrative portion of the audio-visual book is not computer generated, but a reproduction (e.g., recordation) of an actual human voice. In this latter case, the reader software preferably uses a digital transcription of a narrator's pre-recorded voice to enable the fullest enjoyment of the storytelling experience brought about by the subtle changes in tone and inflection of the narrator. Most preferably, books published in accordance with embodiments of the present invention will be able to be heard in any MP3 CD device, such as a car's MP3 player, portable MP3 players, DVD players, and other MP3 devices, etc. MP3 (MPEG-1 Audio Layer-3) is a standard technology and format for compression of a sound sequence into a small file while preserving sound quality. MP3 files may also be readily downloaded via the Internet. MP3 is a powerful algorithm in a series of audio encoding standards developed under the sponsorship of the Motion Picture Experts Group (MPEG) and formalized by the International Organization for Standardization (ISO). While MP3 is used in the most preferred embodiments, numerous other formats may be employed in various other embodiments.

In preferred embodiments, the audio track of the audio-visual book is cross-indexed in such a way that an individual user can bookmark the text so the reader can return to the position where the reader left off and resume reading or listening. In preferred embodiments, consumers will have the ability to read the book and, at the same time, actually listen to the book, as it is read to them by an actual human voice.

In preferred embodiments, a system is provided which includes both software for "creating" the audio-visual book—the preferred embodiments of which are referred to under the trademark AV CREATOR™—and for "reading" the created audio-visual book—the preferred embodiments of which are referred to under the trademark AV READER™. In preferred embodiments, the AV CREATOR software and the AV READER software are provided on separate CDs or other forms of computer readable media. In some illustrative embodiments, the reader and/or creator software can be created using C++, visual basic and/or other known programming languages.

In preferred embodiments, the "reader" software allows individuals to seamlessly link a human-voice audio narrative copy of a book with the digital text of the book. Preferably, the "reader" software includes at least some of the following functionality: word searching function to locate a position of a word or words in the book; an electronic dictionary function to enable reviewing the meaning of a word or words; an indexing function to enable the indexing of portions; a highlighting function to enable the highlighting of portions; a note taking function to enable the taking of notes (e.g., on the visual text display via a computer display or the like); and/or a book marking function to enable the book marking of portions.

The preferred embodiments of the present invention may offer readers one or more of the following advantageous features:

1. The ability to read books and/or to listen to real-life actual narrations.

2. The ability to provide text versions using the text file format RTF (Rich Text Format).

3. The ability to provide audio portions produced using MP3 digital technology, such that the books may be provided on CDs (i.e., preferably, the entire book is thus on a single MP3 CD), along with the ability to be listened to the same on MP3 audio devices, such as computers, portable MP3 players, MP3 car CD players and/or more.

4. The ability to produce electronic digital versions of books on CDs or the like, providing consumers the ability to purchase "physical" audio-visual books from local bookstores and/or from on-line bookstores, such as AMAZON. COM. (As a result, the preferred embodiments enable the maintenance of many traditional advantages of physical books, such as the ability to purchase an actual copy, the ability to maintain a library on traditional bookshelves in a home, office, educational center such as a library, and/or the ability to give a physical copy as a gift. While retaining these physical qualities, the preferred embodiments may provide individuals the ability to read the books and/or listen to real-voice human narrations thereof.)

5. The ability to provide electronic books on CDs along with a copy of the audio-visual reader software already installed thereon so as to eliminate the need for individuals to download and/or install electronic digital readers from the Internet. (In preferred embodiments, the audio-visual reader software will automatically install on a user's computer [e.g., personal computer, lap top computer or the like] if it is not already installed on a hard drive of the computer.)

6. The ability to be used with laptop computers, desktop PCs, handheld devices, etc., now available and/or later made available. (In some embodiments, other computer readable mediums may be used instead of CDs, such as in some illustrative examples, CD-ROMs, CD-RWs, CD-Rs, SMARTMEDIA storage cards (e.g., removable flash memory cards or the like), COMPACTFLASH cards (e.g., having solid state memory or the like) or other computer readable media currently known or later known.)

In the most preferred embodiments, existing industry formats can be used. Among other things, this enhances the utility of the product. For example, the preferred embodiments use existing text and digital formats, which have been accepted as standards in certain contexts. First, Rich Text Format (RTF), has come to be generally accepted by the "publishing industry" as a standard format for publishing books. Second, the "digital music industry" has generally accepted the MP3 format as its industry standard. In the most preferred embodiments, these existing and well-accepted file formats are combined together.

In the preferred embodiments, a "creator" program provides a connection between these two file formats that creates a seamless link between a "real-human voice" prerecorded narrative copy of a book and the digital text of the book. Preferably, the audio-visual reader software provides individual readers a more versatile method to conduct reading. In preferred embodiments, users receive the option to read and/or to listen to a book that is read to them by a real human voice (i.e., with corresponding pauses, delays, inflections, etc., imposed by the narrator, as well as any additional narrator statements and/or alterations and/or interpretations of the spoken text) which may, among other things, expediently increase the efficiency and/or efficacy of reading. In the preferred embodiments, users are able to read and, at the same time, listen to a real-life voice so as to provide a multi-sensory learning experience and advantage.

In the preferred embodiments, a CD or the like may be created using a creator program that facilitates the electronic publishing of a book on a CD or the like, including both the audio (e.g., narrative) and text version of the book. In preferred embodiments, these CDs will be available for purchase from local bookstores and/or on-line bookstore. Additionally, the software found on these CDs (e.g., the electronic books and/or the associated reader software) can also be downloaded via the Internet or the like in some preferred embodiments.

In the preferred embodiments, the reader software enables users to insert a bookmark which allows the reader to return promptly to substantially any part of the book. In the preferred embodiments, the reader software will also enable the user to re-insert an audio-visual book contained on an MP3 CD into any MP3 CD device and go directly (e.g., fast forward) to where they left off (e.g., to where they had bookmarked). In preferred embodiments, users can have multiple bookmarks. In other preferred embodiments, users can be provided with unique bookmarks for separate users.

In the preferred embodiments, one or more of the following features can be provided:

1. The "creator" software can be used to produce an audio-visual book on a CD or the like and can be read by the average computer CD or the like drive.

2. The "reader" software can be used to provide users the ability to "bookmark" the digital text that is displayed (e.g., on a computer monitor or the like) so that if the reader software program is closed or if the computer is shutdown, the user can resume reading or listening to the digital recording at a point that was previously book-marked once the user reopens the reader software on that same computer. Preferably, multiple users can have unique bookmarks with unique identities.

In some optional embodiments, a routine can be included that will automatically save the last page number or the like (e.g., bookmark) of the last page displayed in the event that the user inadvertently stops the program or the computer crashes or otherwise shuts down execution of the reader software. In less preferred alternative variations, the location (e.g., sentence) of the text that was last highlighted when the catastrophic event occurred could be written to disk or the like and repeatedly updated (e.g., as, each sentence gets highlighted). However, in preferred embodiments where the "page number" is saved, then only that info needs to be updated and written to disk each time the user turns the page or the like, which would include much less overhead (while not marking the exact spot where the user left off).

3. The "reader" software preferably provides the user with the ability to read the text content, to listen to the digital recording and/or to do both simultaneously. Preferably, the software provides the ability to switch back and forth between reading and listening with ease (e.g., with one click of the mouse or other pointer device for positioning on a display).

4. The preferred embodiments include an MP3 sound file format and an RTF (Rich Text Format) text file format.

5. The "reader" software preferably provides navigation via an audio-visual book outline to quickly locate a particular section of a book. In preferred embodiments, the granularity of this capability may, at least in part, be dependent upon the level of granularity that the creating editor uses when a CD or the like is created.

6. The "reader" software preferably does not encode bookmarks directly to the medium containing the audio-visual book (e.g., to the MP3 CD or the like) in some embodiments. In such embodiments, the user preferably has the ability to export to a write-able media, such as a floppy diskette or other form of write-able media, which may then be transported to another computer running a copy of the "reader" software. Thus, the audio-visual book may be on a non-write-able CD or the like, and yet, users will still be able to read the same book on more than one computer and preserve their personal bookmarks. Similarly, in some preferred embodiments, annotations can be similarly saved on a separate write-able media. In some embodiments, a file can potentially be created that can be forwarded in another manner (e.g., via e-mail, file transfer protocol, or the like, over the Internet or the like) to, e.g., a location or URL at or accessible to another computer. Movement of personal bookmarks between computers running the reader software may be supported, for example, by an "import/export" function in the "reader" software.

7. The "reader" software preferably uses commercially available MP3 players to listen to the MP3-encoded sound recordings. For example, the software may call-up or initiate the playing of the sound via an available MP3 player. For instance, many computers have players built into their operating systems (e.g., WINDOWS 98, etc.). Other players may include, for instance, WINAMP (PC), MACAMP (MAC), MPEG 123 (UNIX) or the like.

8. The "reader" software will preferably be able to display the corresponding text as the sound file is played. Preferably, the corresponding text displayed by the reader software will be highlighted to keep pace with the audio portion. In some illustrative embodiments, highlighting may include the following or other forms of highlighting:

altering the background behind the text (e.g., the color of the page surrounding the text);
   changing the color of the text;
   changing the font of the text;
   changing the brightness of the text;
   changing the darkness or contrast of the text;
   changing other characteristics of the text;
   changing characteristics on a sentence-by-sentence basis (i.e., having the sentence presently read of a different quality that that fore and aft);
   changing characteristics of past read sentences (i.e., having the presently read sentence and the sentences to be read of a like quality (e.g., for instances shadowing or lightening the text of already spoken text); and/or
   changing characteristics in a different manner.

The above and/or other aspects, features, advantages and/or benefits of various embodiments of the present invention will be further appreciated in view of the following description, taken in conjunction with the accompanying figures, as well as upon implementation and/or practice of the various embodiments of the present invention. It should be appreciated that various embodiments will include and/or exclude different aspects, features, advantages and/or benefits of the present invention and that descriptions of aspects, features, advantages and/or benefits of the various embodiments should not be construed as limiting embodiments nor the inventions claimed.

DETAILED DESCRIPTION OF THE PREFERRED EMBODIMENTS

A notable feature of the most preferred embodiments is that the audio and visual book can be seamlessly linked together so that the reader can switch back and forth "at will"—substantially instantly—between the two methods (i.e., visually reading on a computer display screen and/or listening to the book being read aloud by an actual pre-recordation of a narrator's voice or the like). In the most preferred embodiments, the audio portion of the book is a recordation of a real live human voice, with the intonations and subtleties that only a human voice can reproduce, which further enhances the reading experience.

In preferred embodiments, the computer readable medium that is used is an MP3 format CD (rather than a standard compact disc which could be used in less preferred embodiments). Among other things, current audio book compact discs have lower audio quality and may require multiple discs to store a single book. Moreover, they can typically only be played in standard CD players with very little control and/or search capabilities. In the preferred embodiments, the use of an MP3 or the like format allows for much higher quality recording and most books can be stored on one MP3 CD, or on other computer readable media. Most advantageously, an MP3 CD or the like medium can also be used with various "audio-only" players, etc., such as in a portable MP3 player, or in a car MP3 player, or in another player that has next track features typically for "music" purposes, but that works with features of the preferred embodiments such as listening to a MP3 CD while moving to appropriate chapters, pages, paragraphs, sentences and/or words when reading interruptions occur (e.g., book-marking) and the like.

In the most preferred embodiments, the "reader" software that allows the audio-visual book to be visually and audibly used is installed on every or substantially every audio-visual book physical medium (e.g., on every CD, computer readable medium or the like) that is purchased by the consumer. In the most preferred embodiments, one or more, preferably all, of the following functions can be included in the reader software:

Highlighting;
   Page Forward and/or Page Back commands;
   Fast Forward and/or Fast Back page commands;
   Book-marking;
   Note-taking (e.g., Annotation);
   Zoom In and/or Out;
   Page Rotation;
   Single and/or Two Page Display Format;
   Printing of Highlights and Notes;
   Word Search;
   Dictionary;
   Copyright Protection (e.g., in preferred embodiments, the CD may be restricted from being copied);
   Library (e.g. preferably a pictorial library);
   Library Selectability (e.g., listing by title, author, subject and/or genre);
   Library In/Out Identification/Notification (e.g., enabling a user to identify which books may be contained within digital storage and which books may be located elsewhere);
   Highlight Color Selection (e.g., using a color pallet selection);
   Read Aloud Highlight Sentence Tracking Color Selection;
   Highlight Readback;
   Import/Export;
   Help (How To Use Instruction Book in Library);
   Pop Up Note Recall; and/or
   Multiple Reader ID.

In the most preferred embodiments, the reader software enables a user to "highlight" any portion of the text at anytime while reading the visual text or when the text is being read. Preferably, the highlighted portion of the text can then be saved to another file or to a directory or to another disk or CD. Preferably, this highlighted text may be saved in the computer or elsewhere and be read back at some time (e.g., separate from the reading of the book). This can be useful, for example, as a study aid.

In the most preferred embodiments, the highlighted portion can be shaded in a variety of colors. Preferably, the colors can be pre-selected from a color pallet in an "options menu" displayed on, for example, a left display margin. Most preferably, users can use a "separate-color-highlighting" feature for specialized (i.e., to highlight subject matter with different significance or import in different colors)

and/or personalized (i.e., to identify highlighting of one user) highlighting. In the most preferred embodiments, users will save their bookmarks, annotations, highlights and/or the like to their own personal data files, rather than saving such to a common data file.

In the most preferred embodiments, when a user first purchases an audio-visual book and inserts it into his or her computer, the "reader" software is immediately and automatically installed on that computer—that is, if the computer does not have the reader software already installed. This can, among other things, facilitate the installation process. Accordingly, every book medium—e.g., CD or other computer readable medium—preferably has the reader software installed on it along with programming that will automatically install on any computer into which the medium is inserted.

In the most preferred embodiments, once installed, the reader software will automatically display on the computer screen (e.g., preferably an icon is placed on the desktop of the computer display that can launch the software when selected [e.g., when double-clicked]).

In the most preferred embodiments, on installation, a company logo (e.g., AV BOOKS, INC.™ or the like) and/or a flash-screen will display on the screen. Preferably, the flash-screen will disappear within a few seconds (e.g., within about 10 seconds) and a "book-library" will be displayed with a selectable control panel displayed therewith (e.g., on a right side of the screen). The book library is preferably a pictorial library. The book library can preferably be displayed at any time by clicking on a library button (e.g., on a right side control panel or menu).

In the most preferred embodiments, the library displays a picture of the dust cover or of a front cover of all books that are installed on the computer (e.g., within the "reader" software). The library provides a useful record of all books that are installed in the computer. In most preferred embodiments, the library also provides a record of all books that have been installed on the computer, but whose files have since been removed or deleted from the computer. In this manner, the library may provide a record of a) books that the user has already read and/or b) electronic books that the user has on his or her shelf (e.g., in his or her physical library) but not stored on his or her computer. This latter library format can help to save space on a computer by not storing the audio/text files while enabling books to be categorized and organized. Preferably, the user may remove books from the electronic library, if, for example, the user no longer has the book retained in his files.

In some preferred embodiments, rather than installing a book onto a user's computer, a book can only be read from the computer readable medium when it is placed within a disk drive or the like. Among other things, this may help to protect works from unauthorized copying because installing a book on the computer may cause another copy of the book to exist within the client's computer, facilitating the ability to make unauthorized copies in some circumstances. Nevertheless, in some embodiments, the books can be copied to a user's computer. Among other things, this also facilitates having several books open at the same time, whereby, e.g., one may easily review several sources concurrently. This multiple document review can be included in some embodiments of the reader software.

In some embodiments, the library may also be used to save information related to books that the user has read. For example, upon completion, the user may for example, be presented with a "completion" form to confirm that the user read the entire book and/or to enter comments into a comment field. Upon completing the form and clicking "submit," for example, the library preferably stores the book title and other information (along with an automatic date and/or time indication, if desired) and saves that information in a "books read by user list." The books read by user list may contain different books than that present in the library. Additionally, the books read by user list may also be adapted to enable the user to insert information related to books read in other contexts (e.g., hard copy books).

In the most preferred embodiments, if the book is currently installed on the computer, the library will show the book cover as brightly colored (or as otherwise distinguishable from books in the physical library that are not stored on the computer itself). Preferably, if the book is not currently installed in the computer but has been installed on it in the past (e.g., the book is owned by the reader but is presently at home on his bookshelf and not in the "reader" software on his computer), then the library will show the book cover in a ghost or see through color display (or as otherwise distinguishable from books stored in the computer).

In the most preferred embodiments, any book can be deleted from the computer and/or deleted from the library altogether as desired. In some embodiments, whenever an audio-visual book is inserted into the computer, the audio-visual book is "automatically" installed on the computer. Most preferably, an option is provided to the user in an "options section" that allows the reader to request if the book is to be installed and/or not on the computer when the computer readable medium containing the book is inserted into the computer.

In the most preferred embodiments, the library is configured such that by simply "clicking" on the picture of a respective book, a full screen view of the front cover of the selected book will replace the library screen and the book will be loaded for reading and/or listening.

In the most preferred embodiments, clicking on a "page forward" button will then open the book to the first page. Preferably, the book will automatically open up to a two-page display (i.e., a left and right page display), unless a single page display is requested on a command menu (e.g., provided at the right side of the display in preferred embodiments). Most preferably, the pages of the displayed text contain the same or substantially the same text as the corresponding pages of a hard-cover copy of the book.

In the most preferred embodiments, a user can then click a listen button and the reader software will begin to read in an actual human voice. In preferred embodiments, the reader software can be made to stop reading by a simple additional click of the mouse or the like (e.g., by clicking a stop button or by clicking the listen button a second time or the like). Most preferably, as the book is read aloud, the sentences are shade-colored or otherwise highlighted so that when the user discontinues the audio portion of the book, the user will know exactly where the user is in the text location.

In the most preferred embodiments, when a user is reading text in a traditional (i.e., visual manner) and the user desires to have the reader software read the text aloud, the user can simply click on a spot where the user desires to have the software commence reading aloud (e.g., by clicking a read button), and the reader software can then pick up at that spot and read the text to the user until the user inputs a command to stop.

In the most preferred embodiments, during audible reading of the narration by the software, when the reader software reaches the bottom of a page, the display will automatically advance to and display the next page. On the other hand, when a user is reading the visual text, advancing to the next page is preferably accomplished by clicking a "page forward" button (e.g., on a right side command menu) or the like. Preferably, moving back through the pages can be accomplished by clicking on a page back button (e.g., on the right side command menu) or the like.

In the most preferred embodiments, if the reader wishes to move forward or backwards through multiple pages, he can simply click on a "Fast-Forward" button or on a "Fast-Back" button on a command menu (e.g., on a right side command menu) or the like.

In the most preferred embodiments, a "cursor bar" or "knob" is provided at the bottom of the display screen (or at another suitable location) that can be moved left and right by clicking on it and dragging it to the left or right. Preferably, this cursor movement will advance and/or retreat the display of the text through the book pages at a high rate of speed (preferably, the speed can be set to suit the user's needs/desires, such as via an options or properties menu selection). Most preferably, a small pop up box or the like appears when the cursor is activated (e.g., clicked) that indicates the page number that corresponds to the cursor position.

In the most preferred embodiments, a specific page number can also be selected as well as a specific chapter in the options menu by clicking on the appropriate contents table on the left side contents menu.

In the most preferred embodiments, a "bookmark" function is provided that enables the placement of a bookmark at generally any point in the book by simply clicking on the spot to be marked. Preferably, this bookmark function can be used in both the reading and/or listening modes. Preferably, specific reader bookmarks can be assigned using an options menu (i.e., whereby individual readers may receive their own "bookmarks" so that different readers can mark positions (such as where they left off) unique to themselves.

In the most preferred embodiments, when more than one reader identifies unique bookmarks in the options menu, he or she may also identify a specific color to be used in the listen mode. Preferably, the sentence being read will then be highlighted in that specific color for that specific reader so than when reading is interrupted (e.g., by clicking "pause" or otherwise interrupting reading), the user can readily return to his or her point of discontinuation. While highlighting in specific colors is preferred, the highlighting may take on any other form of highlighting and/or distinguishing text. Preferably, when using the "highlighting" mode for book-marking and/or annotation, different colors are used than the "listen mode's specific user highlighting."

In the most preferred embodiments, an "annotation" function is preferably provided. Preferably, at substantially any point in the text of the book an annotation (e.g., a note embedded at that point, a footnote, an endnote or the like) can be inserted. Preferably, clicking on an "annotation" button on a command menu (e.g., in a right-side command menu) and then clicking on substantially any spot in the text will mark that position with a specific annotation identifier (e.g., a number, another alpha numeric indicator, an icon or image or the like) which will automatically be displayed (e.g., such as in a left side annotation list [e.g., under notes or the like]). Preferably, an annotation box or note box (e.g., a pop-up form containing a box into which a user can insert text via a keyboard or the like) will open and the text can be typed into the appropriate box. To retrieve the notes, a user can, in some preferred embodiments, click on the annotation button and pick a note from an annotation list and/or can click on an annotation icon embedded within a particular portion of the text at which the annotation is inserted. Upon doing so, the annotation or note will preferably be displayed. Preferably, the page to which the annotation or note is made will also be displayed.

In preferred embodiments, a volume control function is provided that enables the increase and/or decrease of volume by simply clicking on a cursor and dragging it (e.g., right and/or left).

In preferred embodiments, a zoom control function is provided (e.g., via a button on a right side command menu) that will make the text larger or smaller on the page. Among other things, this may also be highly useful for individuals having visual limitations (i.e., sight impairments).

In a preferred embodiment, a rotate control function is provided that may be initiated, for example, via a button on a command menu (e.g., to make the page display rotate, e.g., 90 Degrees). Preferably, this function is applied only to single page display, rather to a multiple-page display.

In a preferred embodiment, a "format control" function is provided that may be initiated, for example, via a button on a command menu that can switch the display between a single-page display and a two page display (i.e., corresponding to left and right pages of an open book—and preferably corresponding to the same pages in a hard copy of the book) format.

In the most preferred embodiments, the two-page format is provided with a) a center rail image and/or shadow between the pages (e.g., providing an appearance of a center rail of a hard-cover book) and/or b) a side-edge-multiple-page image and/or shadow on the sides of the book (e.g., providing an appearance of a side edge of a hard-cover book). Among other things, this will help to provide a more realistic open book appearance. Additionally, in preferred embodiments, this may also provide a means to facilitate movement within the book to "bookmarks," "annotations," and/or to new positions within the text. For instance, in some embodiments, the user may "skip-ahead" or "move-back" to a particular location by merely clicking a pointer on the side edge of the displayed book. Similarly, in some embodiments, a user may jump ahead or go back to a particular annotation or bookmark (and page to which such is correlated) by clicking the pointer upon a region of a POST-IT like "tab" that may be made to extend from the side of the displayed book to facilitate locating and/or viewing bookmarks in some preferred embodiments. Preferably, the location around the perimeter of a book of such a tab may be changed by dragging the tab via a click and drag technique. However, preferably the "page" to which the tab is linked will preferably not change by dragging the tab, but by affirmatively selecting a desired page number (e.g., entered into a form or the like). Preferably, the tabs may include titles that are visible when extended, and additional text that is visible upon clicking the tabs or upon moving a cursor there-over. In some embodiments, the size of the tabs may be altered (i.e., by dragging a corner or side and/or by selecting pre-set sizes and/or by other means). Nevertheless, enabling the borders of tabs to be sizeable according to the whims of the user may be undesirable in some cases, and in some embodiments, the tabs would have fixed sizes and, e.g., maybe only a page number or the like will be displayed, but when the user moves a pointer over the tab, it may expand to display more information. For example, in some illustrative cases, left-clicking the tab could cause the book to jump to that and/or right clicking on the tab could invoke a floating menu that has the option to move the tab elsewhere in the book. Preferably, the locations of the tabs around the perimeter can be manually set and/or set automatically (e.g., by order of time of creation of the tab, in numerical order, in alphabetical order, by page number, etc.).

In preferred embodiments, when the "library" of the reader software is opened and displayed, a "how to" book is provided as one of the first books in the library. Preferably, it is displayed as the first book in the upper left corner. Preferably, the book describes "how to use the reader software." Preferably, this instruction book has both real-life pre-recorded narration along with a text copy of the book as with the electronic books of the preferred embodiments. Preferably, the "how to" book can be selected, similar to other books, by clicking on an image of the book (i.e., preferably showing an entire front cover "book icon," or by clicking on a "help" button (e.g., on a right-side command menu or the like).

In the most preferred embodiments, a separate "library" listing can be selected under an "options" button that lists all books owned and/or available on the computer. Preferably, the books can be listed in alphabetical order: e.g., either by author, title, subject and/or other. In some embodiments, individual users can have pre-set library arrangement criteria that will show the library arranged to suit their personal needs. For example, a user may re-arrange a library to suit their personal interests, such as by displaying books they have read in one region, science fiction at one region, books by certain authors at one region, books that they wish to read soon in another region, etc. Preferably, the library can be compartmentalized into sub-folders that may have suitable titles. Preferably, pre-established folders can be set to facilitate organization (e.g., Sci-Fi, Fiction, Non-Fiction, Drama, Author, User #1, User #2, Favorites, etc.) and/or folders can be created by users and/or named/renamed as desired. In preferred embodiments, books may potentially be classified under multiple folders that may be applicable thereto. In preferred embodiments, a search engine is provided at which users can locate certain books (e.g., by category, by word/phrases, etc.). Preferably, the search categories can be modified. Preferably, the words/phrases can be searched by reviewing a) all of the text of documents contained within the computer and/or b) summary information stored in a properties file or the like (e.g., having author, title, copyright and/or other information). Preferably, at least some or all of the summary information stored in the properties file is retained in the library database even when the audio and/or video content of the book is removed in order to enable searching related thereto. In some preferred embodiments, properties files may be downloaded via the Internet or the like to the system to add book information to the library (i.e., without having to manually enter data) related to other books (e.g., such as related to hard cover books located on one's shelves). Preferably, a web site is provided that includes information related to substantially any well-known book available, such that information can be readily downloaded by merely clicking on an icon provided therefor.

Preferably, a library display can be provided upon clicking an "options" button that will preferably present a drop-down menu of options and then clicking a "library" button or similar means. Preferably, when a book is first selected, a table of contents (e.g., listing chapters or the like) is automatically displayed as a list on a left-side display (e.g., adjacent to the left side of the display for the book itself). Preferably, in embodiments using both a left side command display and/or a right side command display, at least portions of the left and/or right side displays can be removed from the display (e.g., field of view). This may be used, example, to help enlarge a two-page book display.

In the most preferred embodiments, some or all of the following "bulleted" advantages may be achieved.

The manner in which people read can be greatly facilitated and/or revolutionized. As merely one example, reading can be facilitated by, e.g., initiating the reading of a book in the "listen" mode so that readers can more effortlessly "get into" the story and then once the reader's familiarity with the story is developed enough to facilitate reading of the text (e.g., after the first 20 pages, as just one example), the reader may "pick up" at that point by reading the text alone, so as to facilitate reading for individuals having difficulty "getting started" and/or "getting into" the story (NB: this can be a great learning methodology for individuals/students having reading difficulties)).

Individuals that need to read and/or study for many hours or continuously may take "reading-breaks" without taking a break from the book. That is, a reader may switch for reading mode to listening mode to allow the reader's eyes to rest or to focus at a distance. One theory for the vast number of individuals today that have diminished eye-sight is the enormous amount of time spent focusing one's eyes at a short distance (e.g., at a computer screen or piece of paper) for extended periods of time. Eye doctors often advise clients to take a break once in a while and stare off at a distant object to "rest" one's eyes. This is good in theory, but to date, it has required the user to stop their important reading activities and/or to lose track of where they were. This also increases the users level of stress, rather than decreasing stress, with a relaxing "break." With the preferred embodiments of the present invention, a user can "take a visual break" while continuing with the activity by listening to the text being spoken. Additionally, since the spoken text will be in a real-life voice, it will be much more relaxing to a user. Thus, the present invention can be especially advantageous to students (e.g., who have large amounts of materials to read/learn) and/or to other users that wish to read for prolonged periods of time. It can also provide, for example, a nice means to facilitate "reading-at-night" or the like, where an individual may read text for a while and then, turn off the light, and go to sleep in one's bed with the audio portion of the book picking up just where they left off to softly transition the reader to a sleeping environment. For individuals having "sleeping disorders," this may be an effective technique to facilitate sleeping.

Additionally, the present invention allows a user to "continue" reading a book while performing other tasks. As a result, a reader no longer has to "put down" a book just to take care of some other task. For example, a parent that has to pick up a child at a soccer practice may discontinue reading, but place the disk in a portable audio-player device or in an automobile audio-player device or the like and continue listening using the audio-player device. Other tasks, may include important tasks that individuals (especially students and/or busy individuals) may otherwise neglect (e.g., such as obtaining aerobic or an-aerobic exercise, cleaning, paying bills, etc.). Thus, with the preferred embodiments of the present invention, individuals may take a "brake" from visual reading, while performing other tasks, especially simple rote tasks that do not require significant mental effort to achieve such that a user may continue to pay attention to the narrated book. Notably, these types of tasks will likely be easier to take care of since they may be accompanied by the "reading/ listening" task. While some individuals have been known to listen to "music" with a WALKMAN or the like while jogging, for example, this form of "secondary" entertainment has been less desirable because users typically must initiate the "secondary" entertainment concurrently with the initiation of the "task." Among other things, such existing methods may thus render initiation of the desired task more difficult.

The most preferred embodiments can also increase physical bookshelf space in schools, colleges and/or universities, commercial bookstores, libraries and/or personal homes or residences or the like, while providing physical media (e.g., CDs or the like) that can be maintained and/or handled in a manner similar to traditional books.

The most preferred embodiments enable students or avid readers to carry many more "physical" reading material items (i.e., books) more efficiently.

The most preferred embodiments enable users to retain a "tangible" book asset that can be given as a gift or stored on a bookshelf, in contrast to electronic books that are often, for example, only downloaded via the Internet and are only electronic.

The most preferred embodiments enable highlighted sections of the book to be printed, saved to another disc, saved to a computer, saved into a document (e.g., into a word-processing document, such as WORD, WORD PERFECT, or the like), displayed together via the reader program and/or audibly read back to the user via the reader program (e.g., for study purposes).

The most preferred embodiments can increase studying capabilities since the book can be visually observed and audibly heard, thus increasing the user's sensory usage and focus and enhancing memory retention and studying capabilities. Notably, use of real-life narration can further facilitate memory retention because the nuances in the spoken text may create further dimensionality in the audible information (e.g., incorporating feeling—such as anxiety, excitement, importance, uncertainty or the like—in the tone of one's narration) that can further help to enable individuals mentally associate the information and, thus, achieve enhanced memory or the like.

In the most preferred embodiments, the electronic books are contained on standard CDs with MP3 compression and are readable on MP3 format CD players, which preferably allow searching, fast forward and/or fast reverse capabilities. In preferred embodiments, the compact disc (CD) is a small, portable, round medium for electronically recording, storing, and playing back audio, video, text, and/or other information in digital form. In some preferred embodiments, the CDs may include read-only-memory (e.g., CD-ROM), but some embodiments may include CDs that allow users to record thereon. In other embodiments, other forms of disks or media may be used, such as, for example, digital versatile discs (DVDs). In some embodiments, the media may include a flash card, a memory card, a semiconductor-based memory card, a PCMCIA card, a solid state floppy disk card (SSFDC), or other suitable media. In some preferred embodiments, a CD-ROM is provided that is designed to store computer data in the form of text and graphics, as well as hi-fi stereo sound. In some preferred embodiments, a CD-ROM may be of the original data format standard defined by Philips and Sony in the 1983 Yellow Book, or standards are used in conjunction with it to define directory and file structures, including ISO 9660, HFS (Hierarchal File System, for Macintosh computers), and Hybrid HFS-ISO. In some preferred embodiments, the CD may be about 120 mm (4.75 inches) in diameter and 1.2 mm (0.05 inches) thick and may be composed of, for example, a polycarbonate plastic substrate (i.e., underlayer—which may be the main body of the disc), one or more thin reflective metal (e.g., aluminum) layers, and a lacquer coating.

Among other things, offering books on CD-RW discs, could enable the user to save their bookmarks, annotations and/or highlights on the same CD as the book. This may, however, introduce the possibility of a careless user deleting and/or formatting over the book content in some cases, thus damaging the book. Additionally, the use of a CD-RW may require that the user have either a CD-RW capable drive or a DVD drive to read the book (notably, some MP3 players can also handle CD-RW and CD-R formats). To write to a CD-RW disc, the user preferably has a CD-RW drive (e.g., a "burner").

In some embodiments, a "Research Area" can be added via the reader programming. For example, researchers often use a plurality of cards or pages to jot down notes, quotes, the name of the publication, the date, the author, the page and/or other information, etc., while conducting research. For instance, one or so cards may be used for each piece of information. Then, the cards can be organized according to where the content may fit into a paper or the like. This latter illustrative example could be conducted electronically with some modified embodiments having a "Research Area." For example, the user could, as merely one example, place a checkmark next to a "research" list item in the options menu which would then, in turn, add two list items to a "right-click" floating menu or the like: "add to current card" and/or "create a new card." When the user finds a fact or quote or the like that they want to use, they can, e.g., drag the cursor over the text to highlight it, then right-click on it and choose one of the card list items from the menu. Preferably, the book title, publisher, author, date, page number and/or the selected text are automatically saved to an electronic card. Later, the user can preferably organize the cards and/or use the cards to create a single document. Preferably, the user can create card categories to organize the cards and can display all of them in a window similar to the library display. Preferably, the categories could display in a list (e.g., in a left hand window, similar to the contents list). Preferably, as the user moves the mouse over each card, all of the information on that card pops up and the user can then decide in which category to file the card. Preferably, the user can then drag the card over to the appropriate category and release it. Preferably, an additional feature could be added to allow importing these cards into MS WORD and/or other word-processing applications. For each card imported, a footnote would preferably automatically be generated. All of the contents of these cards would also preferably be searchable. Preferably, cards from multiple books would all be available at any time since they could be saved to the user's hard drive and/or other digital data storage.

In some embodiments, the research functionality could be further expanded to include access to electronic copies of periodicals (such as, e.g., in a network environment in which users access information from remote terminals or computers). Preferably, the publishers of periodicals could embed reference information (e.g., publisher, date of publication, author(s) name, title, etc., for each article) with the document at the time it is downloaded. This would facilitate the index card feature applied to periodicals. The text and images in the periodical could also be imported into the reader without having to be on a CD or in the same format as text on the CD. Preferably, to facilitate operation, an HTML to text converter is employed.

In some preferred embodiments, the reader software creates a graphical user interface that displays icons enabling one or more, preferably all, of the following functionality:
1. Library;
2. Read/Listen (e.g., preferably, one or two button(s) or icon(s) can be used to switch between reading and/or listening);
3. Page Forward;
4. Page Back;
5. Fast Forward;
6. Fast Back;
7. Bookmark;
8. Highlight;
9. Annotate;
10. Page Format;
11. Rotate;
12. Highlight Review;
13. Import/Export;
14. Print;
15. Options;
16. Help;
17. Volume Control;
18. Multiple Reader ID;
19. Unique Bookmarks; and/or
20. Highlight Color Selection.

In the most preferred embodiments, the following functionality is also provided. When the reader software is used to initially display a book on a computer screen or other display, the initial screen view of the book is displayed in a two-page display presenting the same or similar look to an actual hard-copy open book with the gutter graphically displayed in the middle between the two pages. Most preferably, a single page format may be selected at any time, such as if a larger full page print is desired for reading ease.

Most preferably, one or more command menu and/or elements thereof are typically removed from view unless prompted or needed. Most preferably, when a command menu is desired, the two-page view automatically changes to a one-page view to facilitate display of the command menu items. Preferably, a left-side menu is displayed only when prompted, and whenever a feature is commanded that requires the display of the left-side menu, the two-page display will automatically switch to a single page display so that the actual full page of the book can be presented in a manner that it does not compromise the size of the book display or the book print and the ability of the reader to easily read this book print.

Preferably, one or more command menu(s) (e.g., a right-side command menu) will be displayed in large or full size when an initial two-page display is initially presented. Preferably, such command menu(s) may be reduced to smaller icons-only display menus (e.g., by clicking on a small icon at the top of a list of command buttons or the like).

In some illustrative embodiments of the invention, the operation of some aspects of the reader software may be carried out with one or more of the following steps:
1) Start the Reader Software:
   a) Preferably, double-click on a reader icon to launch the reader program.
   b) Preferably, a splash screen first appears.
   c) Preferably, a book library and/or instruction guide will appear.
2) Select a Book:
   a) For example, a user may click on a desired book from the library;
3) Begin Reading and/or Playing:
   a) For example, a user may click on "play" in a command menu displayed with the reader software;
   b) For example, a user may click on "read" in a command menu displayed with the reader software;
   c) For example, a user may place a cursor (e.g., via mouse or the like) at a particular page in the text (e.g., selected by clicking on a table of contents location, a bookmark and/or by clicking on a particular point in the text displayed) to identify a location for which the program will begin display and/or narration;
4) Pause Reading and/or Playing:
   a) To pause/stop reading and/or playing, preferably a user may click on a "stop" button or the like (or may click on the "play" button when the software is currently playing and/or reading the book). Preferably, the play can be resumed by clicking play or the like such that play resumes substantially where it left off when the reader was stopped or paused. In some embodiments, clicking a "play" button may start the media and the face of the "play" button then changes to "pause," at which time clicking on the "pause" button may cause the play to pause, not stop, and the face of the button then changes back to "play."
5) Highlight Text:
   a) Preferably, a user may first click a properties button and then select a highlight color;
   b) To select the color, the user preferably clicks once on the color to be used for highlighting;
   c) Preferably, the user then clicks once on an "OK" button or the like to close the properties window and save selections made;
   d) Preferably, to highlight, the user clicks on the highlight button in a toolbar or command menu or the like and then proceeds to identify beginning and end portions of text to highlight (e.g., clicking and dragging and un-clicking or blocking portions of text in a manner similar to that used in MICROSOFT WORD and/or other word processing programs)).
   e) Preferably, highlighting may be removed as desired.
   f) Preferably, the highlighting is saved within an XML document that contains the highlighting information. Preferably, the XML document is unique to a particular user and can be called, for example, "personal.xml." Preferably, the XML document includes some or all of the personal information related to a particular user or group of users (e.g., that user's highlighting information, annotations, bookmarks, etc.).
8) Bookmark:
   a) Preferably, to use a bookmark function, a user clicks on a bookmark button or icon.
   b) Preferably, a user can click on a bookmarks tab in an explorer window or the like to display bookmarks that have been made.
   c) Preferably, to set a bookmark, a user places a pointer at a particular page and/or location within the text and clicks the bookmark icon or the like.
   d) Preferably, to add a descriptive note to a bookmark, a user can fill in a form window or the like. For example, a user may right click (e.g., double click) and be presented with an option stating "Add Note" within a popup menu.
   e) Preferably, the bookmarking is also saved within an XML document (e.g., preferably, the same document used for the highlighting, etc.) that contains the bookmarking information. Preferably, the XML document is unique to a particular user and can be called, for example, "personal.xml." Preferably, the XML document includes some or all of the personal information related to a particular user or group of users (e.g., that user's highlighting information, annotations, bookmarks, etc.).

f) Preferably, to jump to a previously set bookmark, a user double-clicks on a bookmark from a list of bookmarks or the like that the user wants to jump to and the display and/or reading will move to that location.

DETAILED DESCRIPTION OF THE ILLUSTRATED PREFERRED EMBODIMENTS

FIGS. 1 to 19 show features that may be included within some illustrative preferred embodiments of the invention.

FIG. 1 illustrates, for example, elements within a system that may be employed within some illustrative preferred embodiments of the invention. As shown, a computer readable medium 10 preferably includes: a pre-recorded audio narration of substantially an entire book 11; electronic text 12 of substantially the entire book; a linking file 13 linking time signatures of the pre-recorded audio narration with locations within the electronic text; a reader program 14 adapted to cause a computer to display text of the book, to play the pre-recorded audio narration of the book, and to allow a user to link there-between as desired using the linking file; and an automatic installation program 15 to automatically install the reader software upon placement of the computer readable medium within a computer.

The computer readable medium 10 is preferably housed within a container 20. Most preferably, the container 20 has a picture that is visible from a front surface thereof that is substantially the same as that on a hard-cover copy of the book (see, for example, FIG. 1C, picture 21), and having a spine 25 from which is visible a title of the book and/or the author's name (see, for example, FIG. 1C, region 22). In the illustrated embodiment, the medium 10 may be a standard CD and the container 20 may be a standard CD container (e.g., made with a clear plastic cover 23 and a container body portion 24). In other embodiments, the container may be adapted to more closely resemble or parallel common paperback book sizes to facilitate adjacent and/or common placement on shelves or the like in physical libraries, storage or the like.

As shown, the medium 10 is preferably configured so as to be placed within a computer 30, such as a personal computer, a lap top computer, a personal digital assistant or any other appropriate computer device. In the illustrative embodiment, the computer 30 includes a display 31, a keyboard 32, a pointer device 33 (e.g., a mouse or the like as shown), and a base unit 34. The base unit 34 preferably includes a central processing unit, memory (e.g., random access memory (RAM), read only memory (ROM)), digital data storage, and communication means (e.g., modems, ports, etc.). As shown, the computer preferably includes a drive 35 into which the medium 20 may be placed for use of the electronic book.

Upon placement of the medium 20 into the computer 30, the reader software is preferably automatically launched and a graphical user interface 36 is displayed upon the screen of the computer display 31.

As shown in FIG. 1, in some embodiments of the invention, an actual hard-copy of the book 40 may be sold along with a computer readable medium 20 contained therein (e.g., attached inside the front cover as shown or, more preferably, attached inside the back cover). The medium 20 may be attached via a pouch, tape, adhesives and/or any other suitable means. In this latter embodiment, the book 40 itself essentially serves as a container 20 for the medium 20. In this manner, readers of the hard-cover book will be able to receive substantially greater reading enjoyment and functionality. By providing readers with both electronic and hard copies of the book, the users may also be able to listen to the electronic narration while concurrently following the narration within the "hard" copy of the book, if desired. Among other things, concurrently using a hard-copy of a book with an electronic-copy may facilitate having multiple individuals read along together (e.g., multiple individuals may have separate hard-cover books while a common auditory narration is played to all concurrently), such as in book clubs, study groups and/or educational or school environments. Similarly, while the illustrative system shown in FIG. 1 shows a single computer 30, in some embodiments, multiple computers and/or multiple displays from a single computer may be provided (e.g., so as to enable multiple persons to concurrently view and/or read the text while listening to the same audio output, such as in a class room setting or the like).

As illustrated in the system shown in FIG. 1, computer(s) 30 may, in some cases, be connected to a remote server 50 (e.g., via the Internet or the like using appropriate protocols, such as TCP/IP, etc.). In this manner, the server 50 may be programmed so as to create a web site or the like that a user may access via browser software executing on the user's computer(s) so as to a) download additional electronic books that may be read using the same reader program on the medium 10; b) download other copies, versions, upgrades, etc., of the reader software originally provided on the medium 10; and/or c) provide other on-line functionality. As a result, while an Internet web site is not necessary to carry out the preferred embodiments of the invention, such a web site may be used to supplement and/or to enhance the use and/or operation of the preferred embodiments of the invention. In some preferred embodiments, the computer 30 may also be initially adapted such that it is packaged or sold along with a copy of the reader software already installed (e.g., as part of a computer software bundle included by the computer vendor).

In some embodiments where users are be able to access books via a given server, the server may be restricted in its ability to grant access to a work or book, such as limiting access to a certain number of users at a time. Among other things, this may help reduce unauthorized access to the underlying works.

With the preferred embodiments, the demand for the present form of electronic book may be significantly enhanced—e.g., by providing a wide range of distribution and avenues for receiving the reader software, by providing a wide range of means for obtaining electronic books, and/or by providing means for enabling the electronic books to be easily retained as physical media in a manner like typical hard cover books.

FIG. 1 also illustrates a computer readable medium 60 that is provided in most preferred embodiments of the invention. The computer readable medium 60 includes software that can be sold and/or distributed in order to create computer readable media 10. The most preferred embodiments of the invention involve a system including not only the mediums 10, but also mediums 60, discussed further below, with which the mediums 10 may be readily created (e.g., by publishing companies or the like). In preferred embodiments, the mediums 60 would be acquired or purchased by publishing companies and the like, but the mediums 60 may also be acquired or purchased by any entities or individuals that desire to create electronic books in accordance with preferred embodiments of the invention—thus, facilitating the publication processes for authors, publishers and the like.

FIG. 2 illustrates one optional embodiment of the invention in which audio-visual books of embodiments of the present invention may be created using kiosks 70 or the like at which users may, in essence, create or "burn" books or CDs or the like (e.g., for personal use and/or for other individuals or entities). For example, a kiosk may include a supply of blank CDs and electronic versions of all files required for the books (e.g., stored in digital data storage and/or accessible via a network connection, such as via the Internet as shown). In this manner, users may select a desired book, render a payment (e.g., via credit card or other electronic payment means) and have a electronic book created containing the appropriate files and programming. In this manner, for example, establishments (e.g., book stores or libraries) can avoid needing to have excess media on hand, but yet may be able to provide user's with "hard" copies of physical media on demand. In some embodiments, the kiosk may also include a printer that can print a corresponding insert to place into a container for the media (e.g., to print sheets similar to that shown in FIG. 1C). In some cases, kiosks may be centrally located for use by customers, while in other cases, kiosks may be located for use by personnel at a particular establishment (e.g., by bookstore staff only).

FIG. 2 illustrates in further detail the variety of methods that may be used to distribute the reader software. In method A, which is a preferred method of deployment, the software is contained on the physical media. In method B, the software is downloaded from a web site or the like for free or for substantially no cost. In method C, the software is distributed on disks or other media for free or for substantially no cost. With respect to methods B and C, the reader software is preferably provided along with a "sample" book or the like to spark the user's interest in the unique nature of the product. For example, a user manual may be provided that includes both text and spoken narration, or a promotional text (with both visual text and corresponding auditory narration) may be provided that includes, for example, commentary on the benefits of the book, portions of selected books, advertisements (i.e., for the software and/or for other products [e.g., which may potentially be purchased by other entities to support the costs for the distribution of the free software], etc.). Additionally, although not illustrated above, it is also contemplated that another method D may be employed for distribution of the software, including providing the reader software as part of an initial software package upon purchase of a computer or the like (e.g., as discussed above).

Figure 3A:
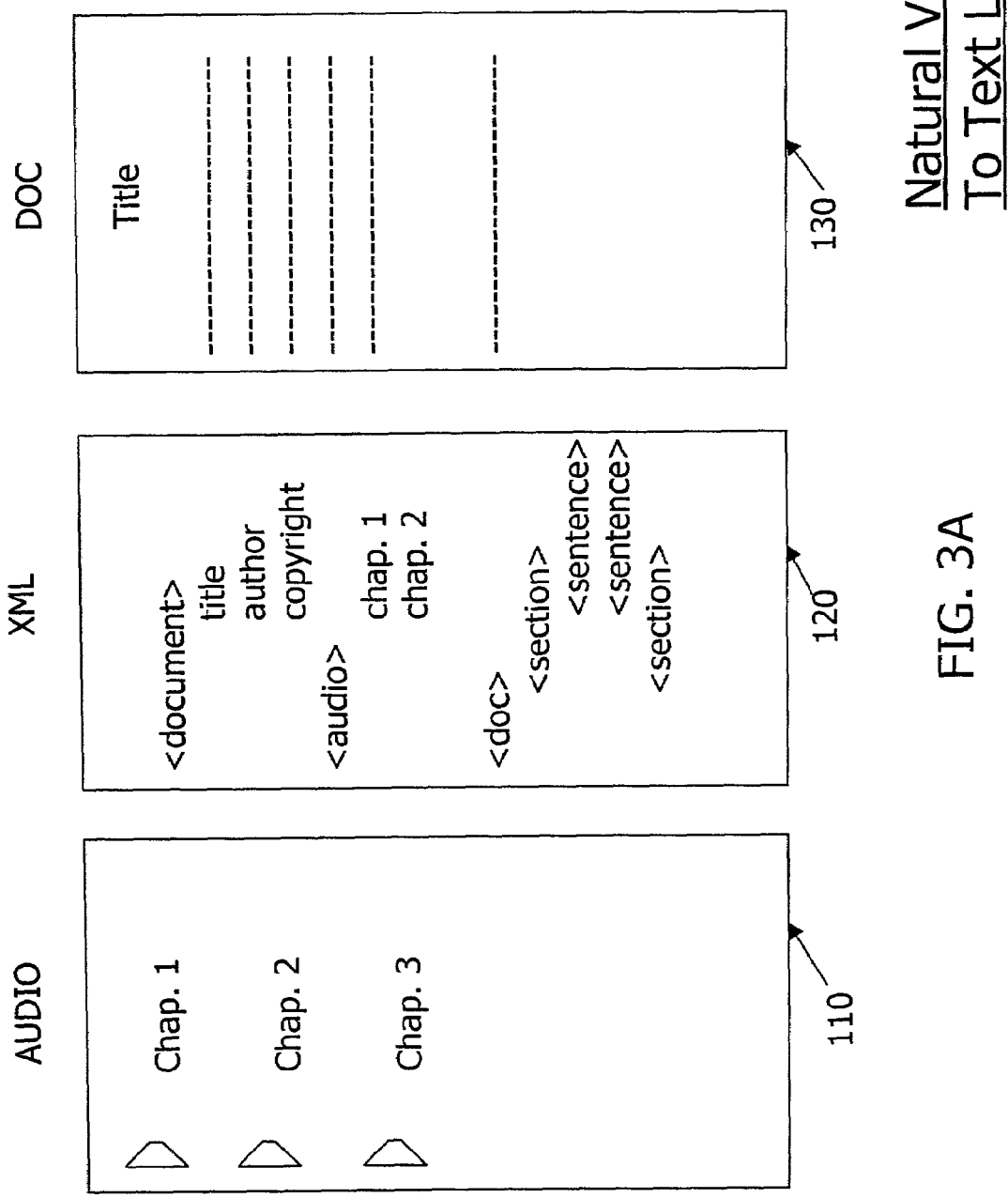

FIG. 3A schematically illustrates some files that may be stored on the computer readable medium 20 in the creation of the medium 10. As shown, the medium 10 includes the pre-recorded real-narration audio 110 (e.g., preferably in MP3 format), electronic text 130 (e.g., preferably in RTF format), and a linking file 120 (e.g., preferably in XML format). The method of making the medium 10 and creating the linking or synchronization file 120 is discussed in further detail below. FIG. 3B illustrates and exemplary XML linking file according to one illustrative embodiment that may be stored on such a medium 10. FIG. 3B illustrates and exemplary XML personal file according to one illustrative embodiment that may be stored, e.g., on a user's personal computer, on a medium 10 (in cases where the medium 20 is write-able), e-mailed, uploaded, FTP transferred or otherwise sent to another location, and/or stored on a second medium (e.g., a floppy disk or the like) for transport of personal information.

Figure 4:
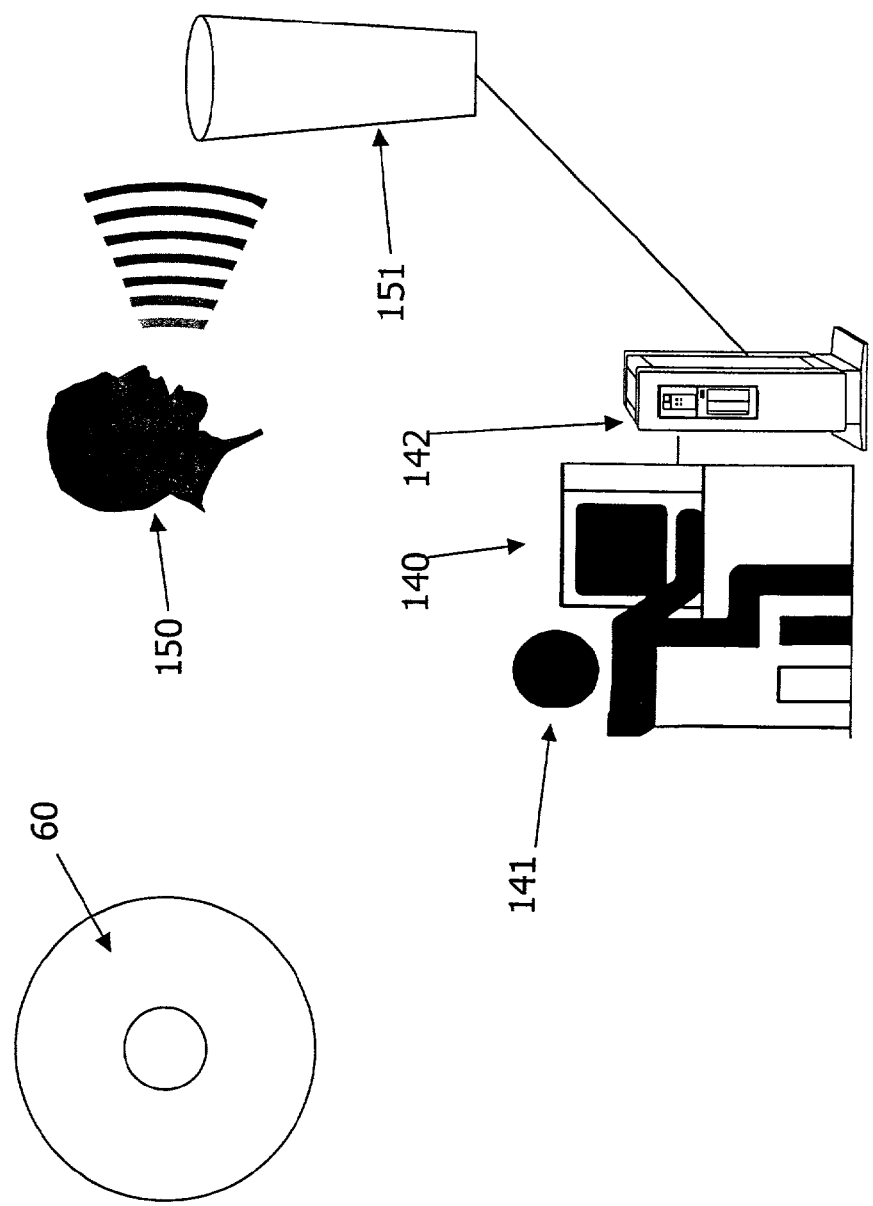

FIG. 4 shows an illustrative system that can be used in order to create an audio-visual book according to the preferred embodiments of the present invention. As shown in FIG. 4, the creation process preferably includes the provision of software on a computer readable medium 60 (e.g., such as that discussed above). This software preferably operates as discussed below to facilitate the "creation" process. This software is preferably employed by an editor 141 who utilizes that software at an editing station 140, including a computer 142 (e.g., which may be similar to computer 30, for example), along with its associated computer display, keyboard, mouse or the like, etc. The editor 141 uses the software to, among other things, create a synchronization file 120 between the pre-recorded audio and the text. As schematically shown in FIG. 4, the audio portion provided to the editor is preferably pre-recorded by a narrator 150 using a recordation device 151 (e.g., including a microphone or the like). Preferably, the recordation device is used to record the audio in a digital format. In some embodiments, the recordation may be carried out at the editing station 140 prior to editing (e.g., such as schematically shown in FIG. 4).

FIGS. 5 to 8 demonstrate some illustrative steps that can be employed during the creation process.

Figure 5:
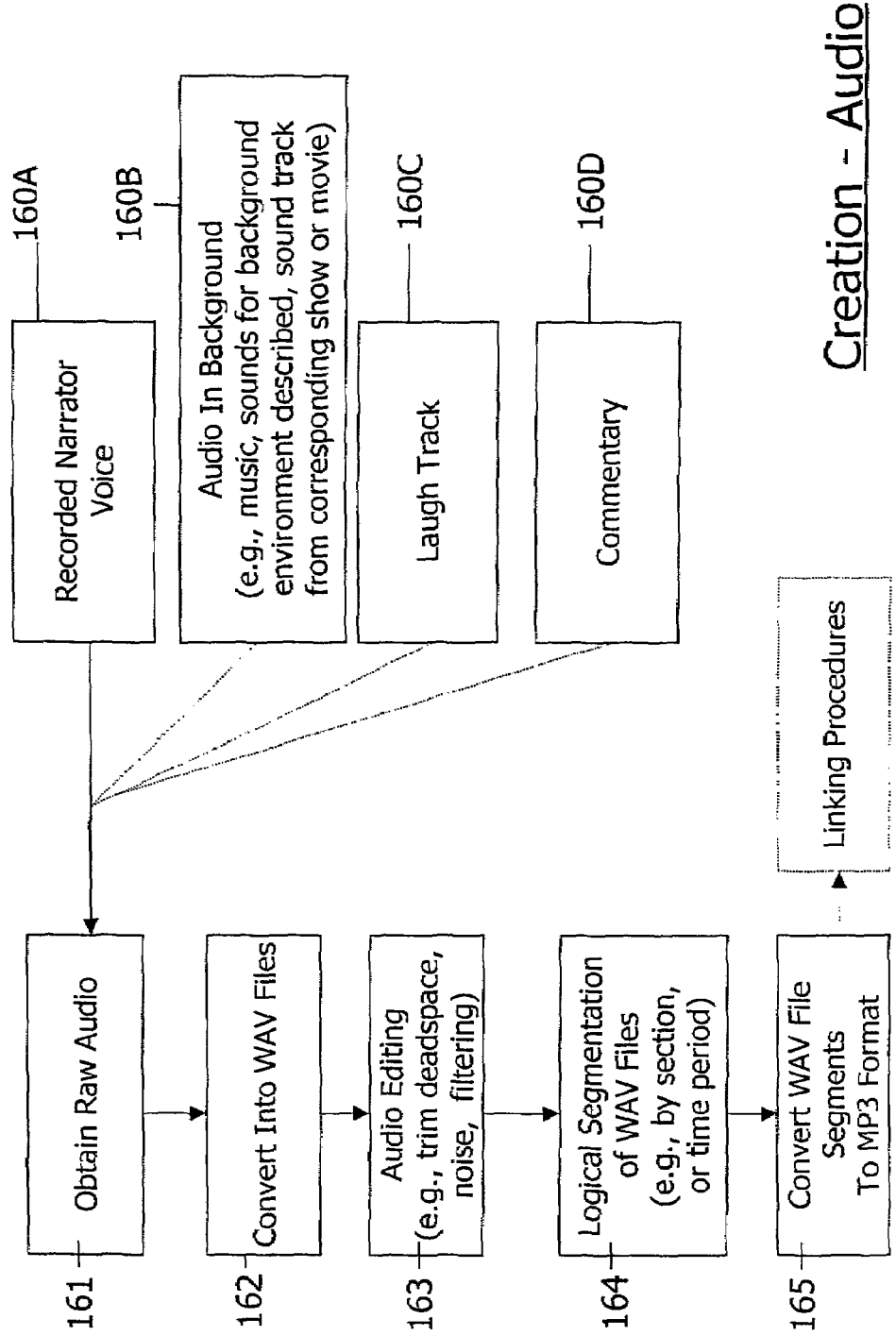

Specifically, FIG. 5 illustrates preferred audio processing steps. As shown, in step 161 raw audio is obtained. The raw audio preferably includes, at least, a recordation 160A of a narrator's voice reading the text of the book corresponding to the text file(s). In some preferred embodiments, the raw audio is modified so as to include additional background sounds 160B, such as, for example, music, sounds corresponding to the background environment described (e.g., foot steps, doors closing, background voices, urban sounds, etc.) and/or audio sound tracks from corresponding movies or the like. In some preferred embodiments, the raw audio is modified so as to include a laugh track 160C. In some preferred embodiments, the raw audio is modified so as to include commentary 160D. In the latter case, in one example, commentary similar to that in the television program MYSTERY SCIENCE THEATRE may be dubbed into the background (e.g., making jokes and/or comments in relation to the subject matter of the book). In some embodiments, commentary such as anecdotes or points of note by the author and/or other individuals may be inserted into the audio portions. In some embodiments, one or more aspect of the background sounds in 160B, 160C and/or 160D may be maintained separately from the narrator's voice (e.g., in separate audio tracks) such that during use, the background sounds may be "inserted," "turned down in volume" and/or "omitted" as desired. In this manner, during use of the product created, some or all of the background sounds may listened to, e.g., even when the narrator's voice is muted or turned off (e.g., during reading of the visual text alone). This may serve as a very good means to enhance the reader's attention and interest in reading the subject matter. For instance, some backgrounds sounds may initiate at or shortly after the "turning of a page" and/or at the shifting of a display to a new page and/or to a new portion of a page (e.g., when less than a full page is displayed on a screen at a given time). Moreover, the reading mode may include a cursor or the like as part of the graphical user interface that may be moved by the user to enable the software to synchronize substantially exactly to the appropriate background sounds.

In step 162, the raw audio is converted in WAV files. A WAV file is an audio file that has become a standard audio file format for everything from system and game sounds to CD-quality audio. A WAV file is identified by a file name extension of WAV (.wav). The wave file format has been accepted as a viable interchange medium for other computer platforms, such as even with MACINTOSH. In addition to the uncompressed raw audio data, the WAV file format may be used to store information about the file's number of tracks (e.g., mono, stereo, etc.), sample rate, and/or bit depth. Alternatively, uncompressed AIFF audio may be used. AIFF (Audio Interchange File Format) is an audio file format used in, e.g., the MACINTOSH operating system. The extension for this file type is ".aif." An AIFF file may contain, e.g., raw audio data, channel information (e.g., monophonic or stereophonic), bit depth, sample rate, and/or application-specific data areas. The application-specific data areas let different applications add information to the file header that remains there even if the file is opened and processed by another application. For example, a file could retain information about selected regions of the audio data used for recalling zoom levels not used by other applications.

In step 163, audio editing on the WAV or the like file(s) is conducted. Among other editing, dead space may be trimmed, noise filtering may be conducted, etc. Various audio editing functions known in the art may be employed.

In step 164, the WAV or the like files are segmented (e.g., chopped logically), such as chopped by chapter, or by certain time periods—e.g., every X seconds or every Y minutes.

In step 165, the segmented files are converted into MP3 or the like format. Alternatively, other compression techniques may be used in other less preferred embodiments. For example, the MICROSOFT WINDOWS MEDIA AUDIO (WMA) format may be used. The WMA format offers a blend of audio quality and small file size. WMA may have some benefits, for example, when used on a pocket PC or the like. In some embodiments, files may include streaming files, such as REAL AUDIO files and/or streaming MP3 files, such as for example, in applications wherein the audio portions may be provided from a remote source (e.g., via variable bit stream or the like). For example, a streaming media format may be desirable in cases where a user accesses a remote computer while on public transportation (e.g., in an airplane seat or the like) or via the Internet or the like. In some embodiments, short video clips could potentially be included. Notably, in embodiments using RTF file format for text, described below, FLASH may sit inside of the RTF files. FLASH is a popular authoring software developed by MACROMEDIA, and can be used to create vector graphics-based and the like animation programs with full-screen navigation interfaces, graphic illustrations, and simple interactivity in an anti-aliased, resizable file format that is small enough to stream across a normal modem connection. A FLASH PLAYER can be used with, for example, INTEL PENTIUM or POWER MACINTOSH to view FLASH content, which performs across multiple browsers and platforms.

Thereafter, the audio file may be used within linking or synchronization procedures described below with reference to FIGS. 7 and/or 8.

Figure 6:
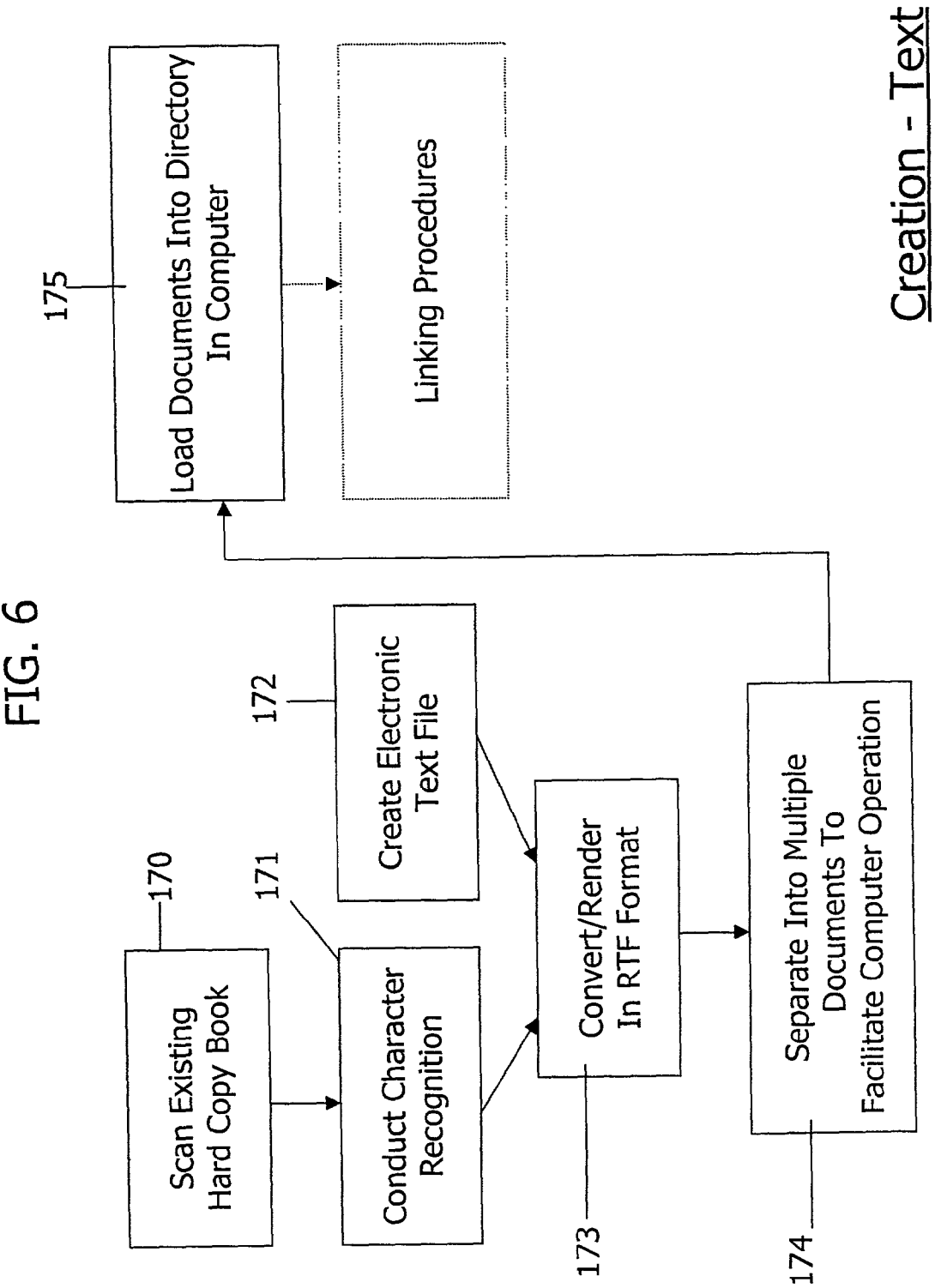

FIG. 6 illustrates preferred text processing steps according to some illustrative embodiments. As shown, the procedures vary based on the product that is initially provided. In many cases, no RTF text file is initially provided and no electronic file format is provided that can be converted into RTF format. Accordingly, in many cases, a document, such as a hard copy of a book, will be electronically scanned 170 and subjected to a text/character recognition software step 171 to convert the scanned text into RTF format. In some cases, an electronic text file will be provided at 172 that may be converted into RTF format or that is already in RTF format. In either event, in the most preferred embodiments, an RTF file format is provided at 173.

In the most preferred embodiments, the RTF file is then separated into multiple documents at step 174. Among other things, this may facilitate operation on a computer (e.g., especially in cases using FLASH, pictures, etc.).

In the most preferred embodiments, the documents are then loaded into a file directory (e.g., within digital data storage) or the like at step 175. Thereafter, the text file may be used within linking or synchronization procedures described below with reference to FIGS. 7 and/or 8.

Figure 7:
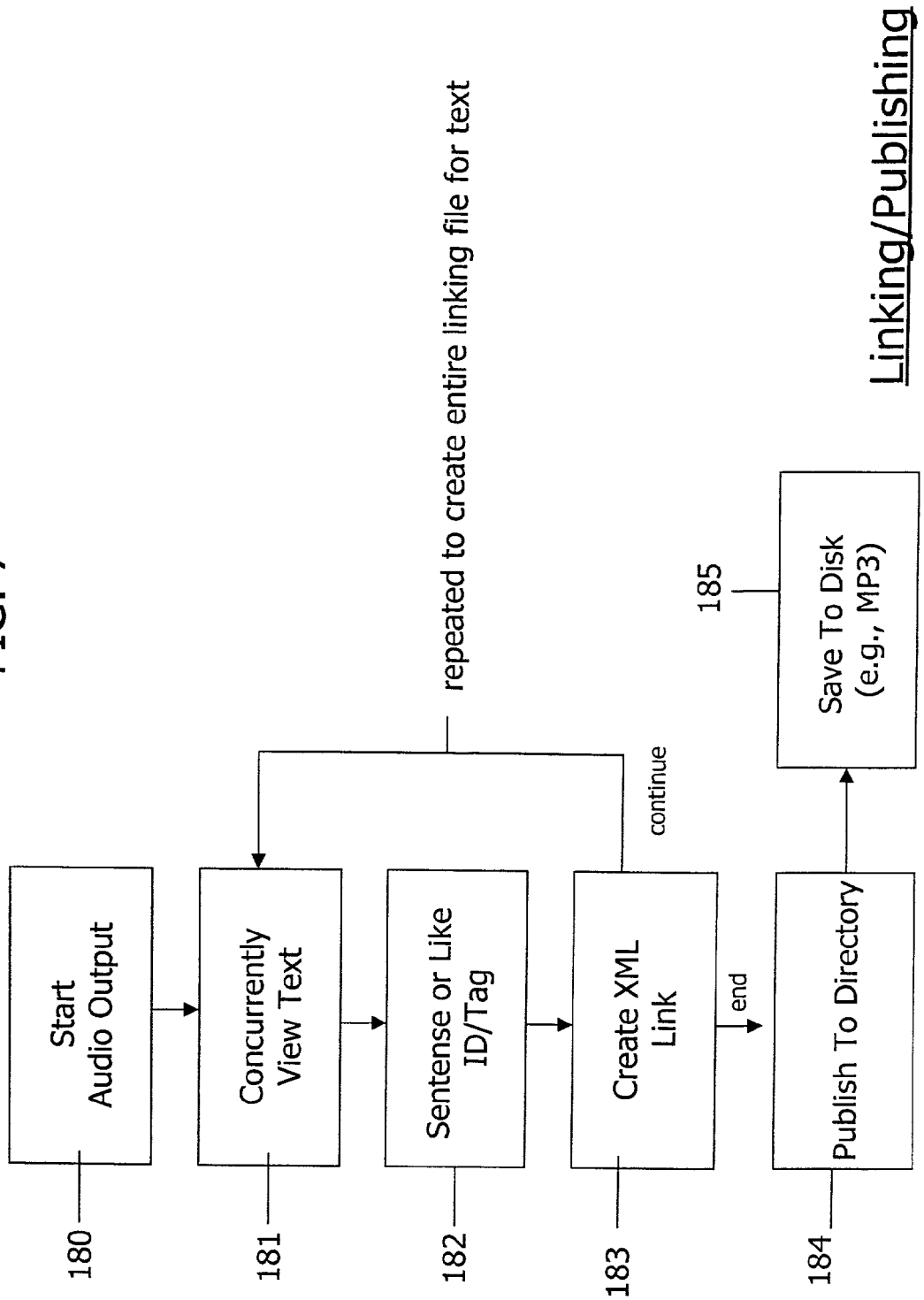

FIG. 7 illustrates preferred steps that may be carried out, for example, by an editor utilizing an editor's station such as, for example, the editor's station 140 shown in FIG. 4. In the most preferred embodiments, the editor is provided with a computer readable medium, such as a CD or the like (see, e.g., disk 60 shown in FIG. 1A) having "creator" software to facilitate the "creation" of the audio-visual book contained on a computer readable medium (see, e.g., disk 10 shown in FIG. 1A).

Figure 12:
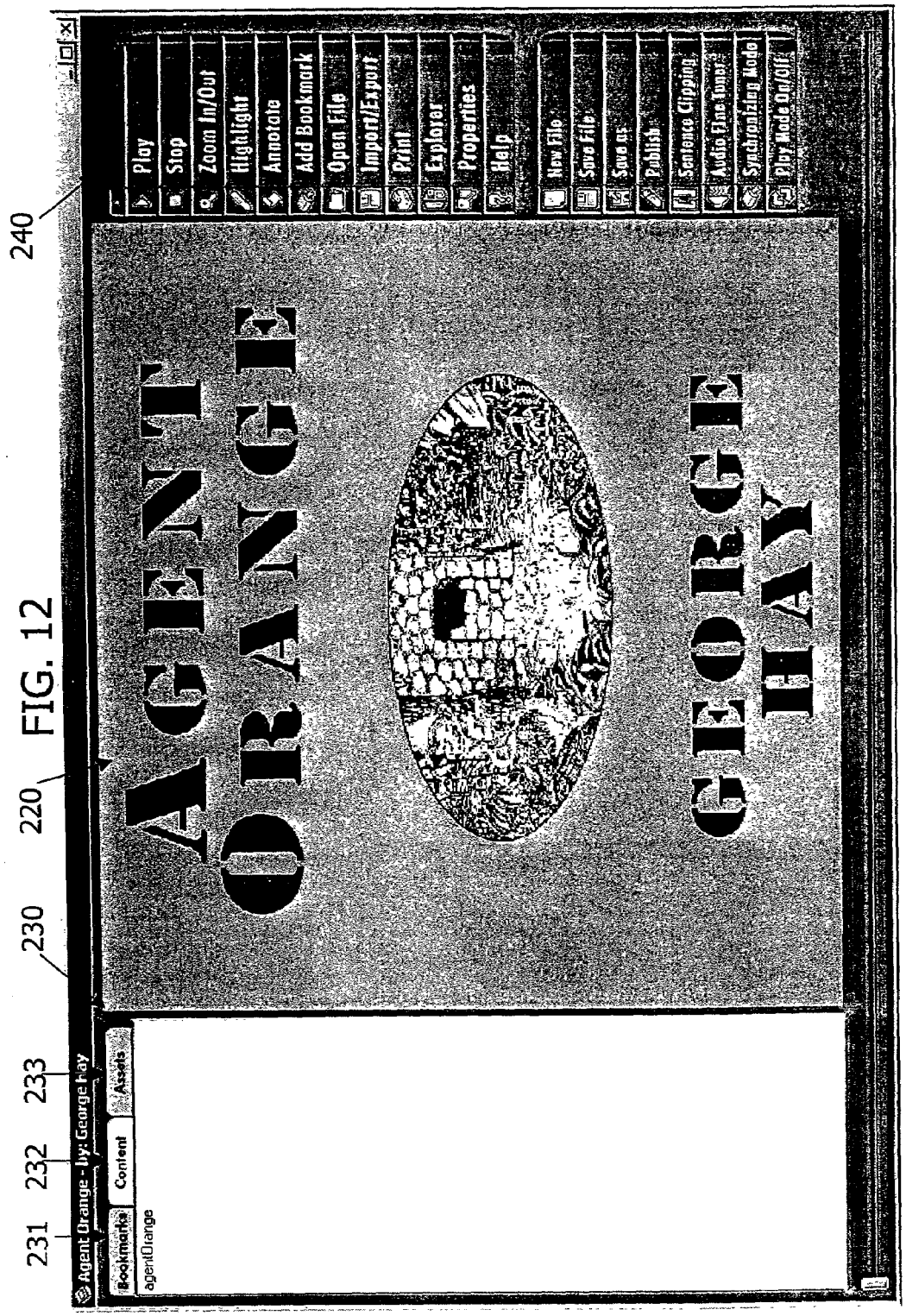

In the most preferred embodiments, the creator software has a generally similar interface to that of the reader software. FIG. 12 illustrates one exemplary graphical user interface that can be provided with the creator software. In the illustrative embodiment shown in FIG. 12, the graphical user interface can include substantially the same screen display as that of the reader software's graphical user interface, with some "special" creator program functionality buttons or icons. For example, in the embodiment shown in FIG. 12, the icons at a lower right side command menu (i.e., new file, save file, save as, publish, sentence clipping, audio fine tuner, synchronizing mode, play mode on/off) may be omitted in the reader software graphical user interface while maintaining the interface substantially the same as the creator program interface. The creator program interface could also omit some of the functionality of the reader program interface, such as functionality used along with a user's personal file creation (e.g., annotation, bookmark, highlight or the like).

In operation, an editor preferably inserts the disk or medium 60 into a computer and/or launches already installed creator software provided on such a disk or medium. In contrast to the reader software, the creator software does not necessarily automatically install or launch upon insertion of the disk in the most preferred embodiments.

In preferred embodiments, the creation process may include steps as set forth below. Most preferably, the creator process includes roles by three "players" (i.e., includes three roles that may be carried out by different persons or entities—in preferred embodiments—or by one or more persons or entities). These roles include: writer (i.e., one or more person that writes the text portion of the book); recorder (i.e., one or more person that records the audio for the first time and places it into a medium, such as a CD); and editor (i.e., one or more person who assembles the audio-visual book package and handles a substantial portion of the creator process).

In one step, audio material recorded by the "recorder" (see, e.g., narrator 150 in FIG. 4) is provided to the "editor." This material is preferably provided on an audio CD. However, any other format in which the editor may obtain the audio and input the same into an editing computer may be used.

In another step, the large audio file containing the entire book will be broken down into smaller chunks or subsets. Preferably, these subsets may correspond to tracks on an MP3-CD player or the like. When the user presses "next track" or previous track buttons on their player, the playback will preferably advance to the next or previous chunk. In some embodiments, for example, this can be used to separate chapters (and/or, e.g., sections, pages, etc.) of a book into individual chunks. By breaking down chunks into subsets of chapters or the like, searching for a piece of audio can be simplified.

In another step, the audio CD will preferably be "ripped" (e.g., converted) into an MP3 file. As a result, the compression may, e.g., enable the storage of 5, 10, 100 or more hours of audio on a single CD. While there may be a tradeoff between "quantity" and "quality," a very high quality CD may be able to contain at least about 14 hours of audio on a single standard CD. As a result, most books (e.g., of average size to even very large novels) should be able to be stored on a single standard CD.

In another step, the material written by the "writer" will be provided to the editor. The written material will preferably include the complete text of the book in digital format. In preferred embodiments, the text is either provided to the editor in RTF (Rich Text File format) or it is converted into RTF (e.g., by the editor). In some embodiments, the editor may preclude certain formats as deliverable formats, such as, e.g., PDF and/or PostScript. However, the editor may alternatively scan a non-readable or hard-copy of the text to render an RTF format document or a document convertible thereto.

In another step, the electronic RTF document is preferably broken down into a plurality of portions. Among other things, this may improve performance on a client machine because it may make the CPU and/or memory requirements lower for a client computer. To the client computer, partitions will preferably flow from one to the next seamlessly, just as with the audio.

In another step, the "editor" (see, e.g., editor 140 in FIG. 4) will initiate the creation of the audio-visual book with creator software (i.e., initiate a new project). Toward that end, the editor will launch the "creator software" on the editor's computer 142. Using the creator software graphical user interface, the editor will then import all of the audio and text components. Additionally, the editor will preferably enter (e.g., via a keyboard or the like) some basic information about the book (e.g., publisher, author, copyright information, etc.). In most preferred embodiments, all resources used in a project are stored in an XML file representing the book. Among other things, XML (Extensible Markup Language) is a flexible way to create common information formats and share both the format and the data (e.g., whether on the World Wide Web, intranets, and/or elsewhere).

In another step, the "editor" will then proceed through the text (e.g., with the creator software displaying the text) and will "block" certain text portions (e.g., most preferably, by sentences, but potentially by phrases, by lines, by words or the like). To initiate this functionality, an editor may click on an icon or button such as the "sentence clipping" icon shown in FIG. 14. For example, blocking of the sentences may include, e.g., clicking a pointer (e.g., via a mouse or the like) at the start of a sentence, dragging the pointer to the end of the sentence and releasing the pointer. This action can then define the boundaries of each sentence (or other portions) to the creator program. In alternative embodiments, a grammar engine could be employed to recognize and block sentences (or other portions) automatically. In preferred embodiments, these blocks are referred to by coordinates within the files and are stored in an XML file describing the book.

In another step, the "editor" will then proceed through a synchronization routine. To initiate this functionality, an editor may click on an icon or button such as the "synchronizing mode" icon shown in FIG. 14. Synchronization and linking of the real-live audio narration and the text is advantageous in view of the large and generally unpredictable and varied pace of a real-live audio narration. In the synchronization process, the creator program will preferably play back the audio to the editor while displaying the text to the editor. The text, however, being unsynchronized will not follow the narration. In contrast, the "editor" will advance the text (e.g., using advance, page forward, scroll bars and/or other advancement commands) and will click on a block of the text (e.g., a corresponding sentence) that corresponds to the audio being listened to at a point in time. This facilitates the semi-manual synchronization by enabling the editor to merely click anywhere within, for example, a sentence at the commencement of the narration of that blocked portion. In preferred embodiments, when a mistake occurs, the mistake can be corrected by merely re-clicking at a corresponding block. Preferably, re-clicking will automatically correct previously designated block-to-audio links that conflict therewith. By virtue of the synchronization process, audio time signatures can be linked to sentence locations or coordinates so that, during use, sentences can be concurrently displayed and/or highlighted as time signatures are reached during audio playback. Moreover, in this manner, users can quickly switch to corresponding audio and/or text by virtue of these linkages.

In another step, the "editor" will publish the book. To initiate this functionality, an editor may click on an icon or button such as the "publish" icon shown in FIG. 14. This will preferably take all of the resources from their various locations and bring them into a single directory, along with the XML file describing the book. Preferably, the publishing step will also bring in all materials (e.g., all software, such as reader software and automatic installation software) needed to run the book off of a computer readable medium, such as a CD.

In another step, the "editor" will preferably take the directory created in the latter step and save this to a corresponding computer readable medium, such as by burning it into a CD. To initiate this functionality, an editor may click on an icon or button such as the "save as" icon shown in FIG. 14. This computer readable medium will then contain all of the software and data required for a user to read and/or listen to the audio-visual book.

FIG. 7 summarizes illustrative steps that may be performed by an editor at an editor's station or the like to create a linking or synchronization file between recorded real audio and electronic text according to preferred embodiments of the invention. In steps 180 and 181, the editor starts playing of the audio (i.e., at step 180) via an audio player and concurrently views text (i.e., at step 181) via a text displayer (note: both the audio player and the text displayer are preferably incorporated in and/or called by a creator program having a graphical user interface similar to that described herein). In step 182, the editor preferably correlates (i.e., tags or identifies) a specific section of the text and a specific time (e.g., interval) in the audio that the editor observes as corresponding to one another. The tag or identification is used to create portions of a linking file (e.g., preferably using XML, such as shown in one illustrative example in FIG. 3B). Steps 181, 182, and 183 are repeated through the entire book so as to create tags or identifiers between corresponding audio and text of the entire or substantially the entire book. Once completed, at step 184 the entire linking file is published to a directory (i.e., preferably, along with other information related to the audio-visual book). Thereafter, the published file may be saved to a disk or to another medium in step 185. In some embodiments, step 185 could potentially include transmission via e-mail, via file transfer protocol (FTP) over the Internet or the like, via streaming media or via other means (e.g., such as in embodiments wherein the file may be accessed via the Internet or via remote computers, terminals or the like).

In the alternative embodiments shown in FIG. 8, a linking or synchronization file may be created completely or substantially via an automated process. As shown, in step 190 a digital audio file(s) can be provided. In step 191, a voice recognition software routine can be executed on the audio file(s). In step 193, the text as "recognized" is compared against a digital text file 192 (e.g., using a grammar checking program or the like) to correlate the actual text with the recognized text. Because the text is, in essence, known, the accuracy of the voice recognition may be very high in correlating specific parts of the text to the spoken audio. In step 194, the recognized text is synchronized or linked with the audio file(s) by the creation of a similar linking or synchronization file to that discussed above. Steps 191, 193, and 194 are repeated through the entire book so as to create tags or identifiers between corresponding audio and text of the entire or substantially the entire book. Once completed, at step 195 the entire linking file may be published to a directory (i.e., preferably, along with other information related to the audio-visual book). Thereafter, the published file may be saved to a disk or to another medium in step 196. Once again, in some embodiments, step 196 could potentially include transmission via e-mail, via file transfer protocol (FTP) over the Internet or the like, via streaming media or via other means.

Figure 10:

FIGS. 10 through 16 show some illustrative embodiments of the invention and demonstrate features that may be employed in the reader and/or creator programs in some preferred embodiments. FIG. 10 illustrates a splash screen that may be presented to a user automatically upon insertion of the computer readable medium 10 into a computer 30 or the like. Preferably, a splash screen is presented to a user upon insertion of the medium 10 and may be present during loading of the software or for a limited period of time (e.g., about 10 seconds in an illustrative case). FIG. 10 illustrates a WINDOWS or the like "desk top" 201 that may be initially displayed on the computer display 31, along with icons 202 of various types. Preferably, upon the initial installation of the "reader" software via, for example, the insertion of the disk 10, an icon 203 will be automatically placed on the "desk top" to facilitate quick and easy launching of the software at a later date. While the illustrated icon reads "AV Books Creator," the icon for the reader software will preferably read "AV Books Reader" or the like. Preferably, after installation, a user can launch the reader software by clicking on the AV Reader icon. Preferably, a similar splash screen 200 will be presented when the software is run each time it is opened.

Figure 11:
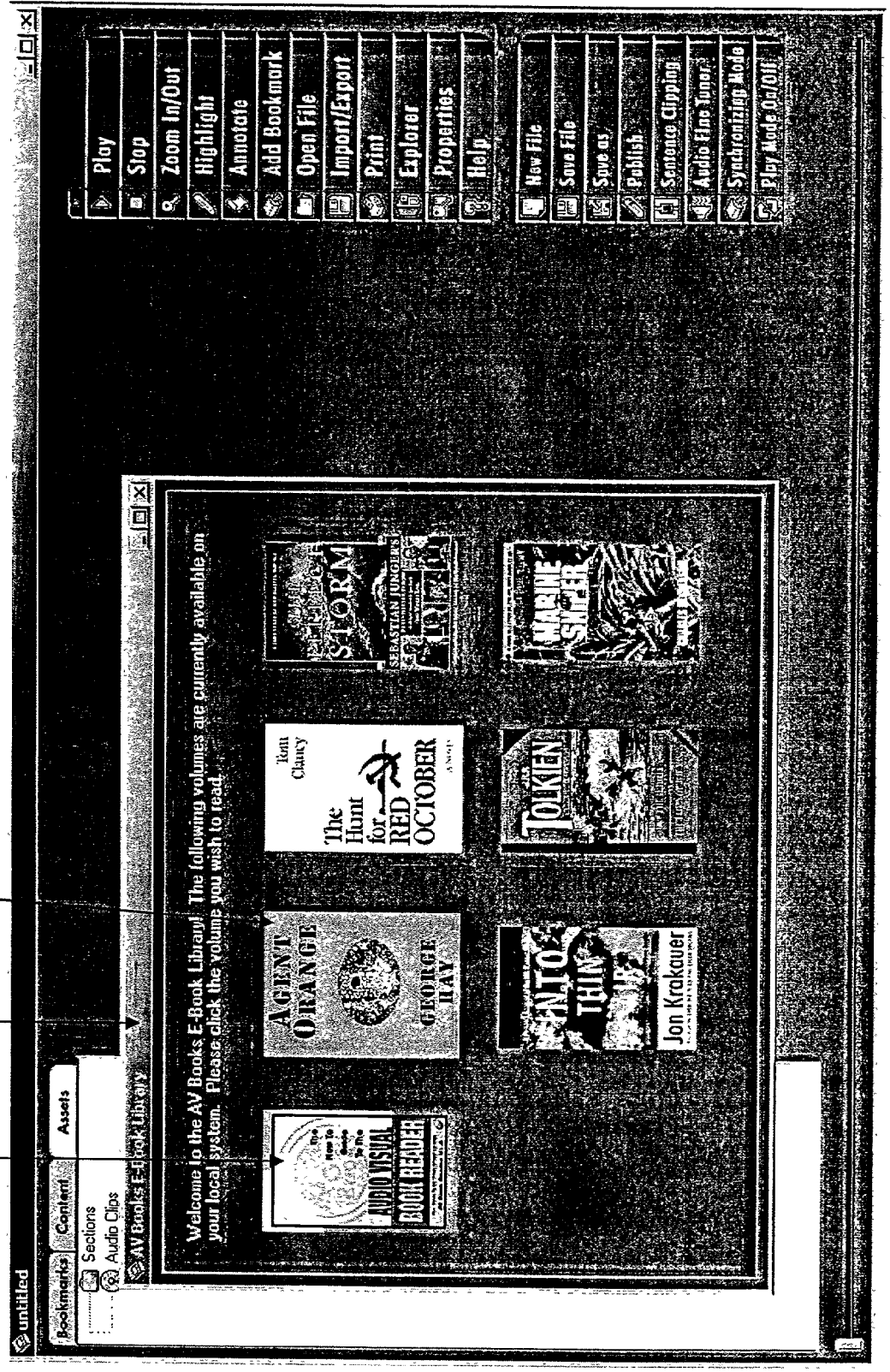

FIG. 11 shows an illustrative "e-Book Library" graphical user interface and display screen 210 that may be employed in some preferred embodiments of the invention. In some preferred embodiments, the e-book library display screen may be presented to a user following the splash screen (e.g., in the event that the user double-clicks the AV Reader icon). Alternatively, an e-book library display screen may be presented to a user upon clicking or double clicking on an icon or button on a graphical user interface such as that shown in FIG. 11 (e.g., see the right hand side command menu). In the latter case, an additional button or icon labeled "library" or the like can be included (see, e.g., the embodiment shown in FIG. 19).

In the embodiment shown in FIG. 11, when a user double clicks on the front cover of a book included within the contents of the library (e.g., six books are shown as contained in the library in the illustrative embodiment along with a "how to" guide 211 for using the reader software), that book will be loaded for reading and/or listening using the reader software. Preferably, the books contained in the data storage (e.g., hard drive) of the computer 30 or the like will be shown along with books previously read using the computer 30 but not or no longer stored in the data storage of the computer. In this manner, a user will be able to keep track of books not contained in the computer, but, for example, located within the physical library of the user. Preferably, the books stored in the computer and the books not stored in the computer will be visibly distinguishable, such as by showing the books not stored in the computer using a faded, ghosted, shadowed, non-colored, marked or other wise distinguished manner from the books stored in the computer.

Figure 13:
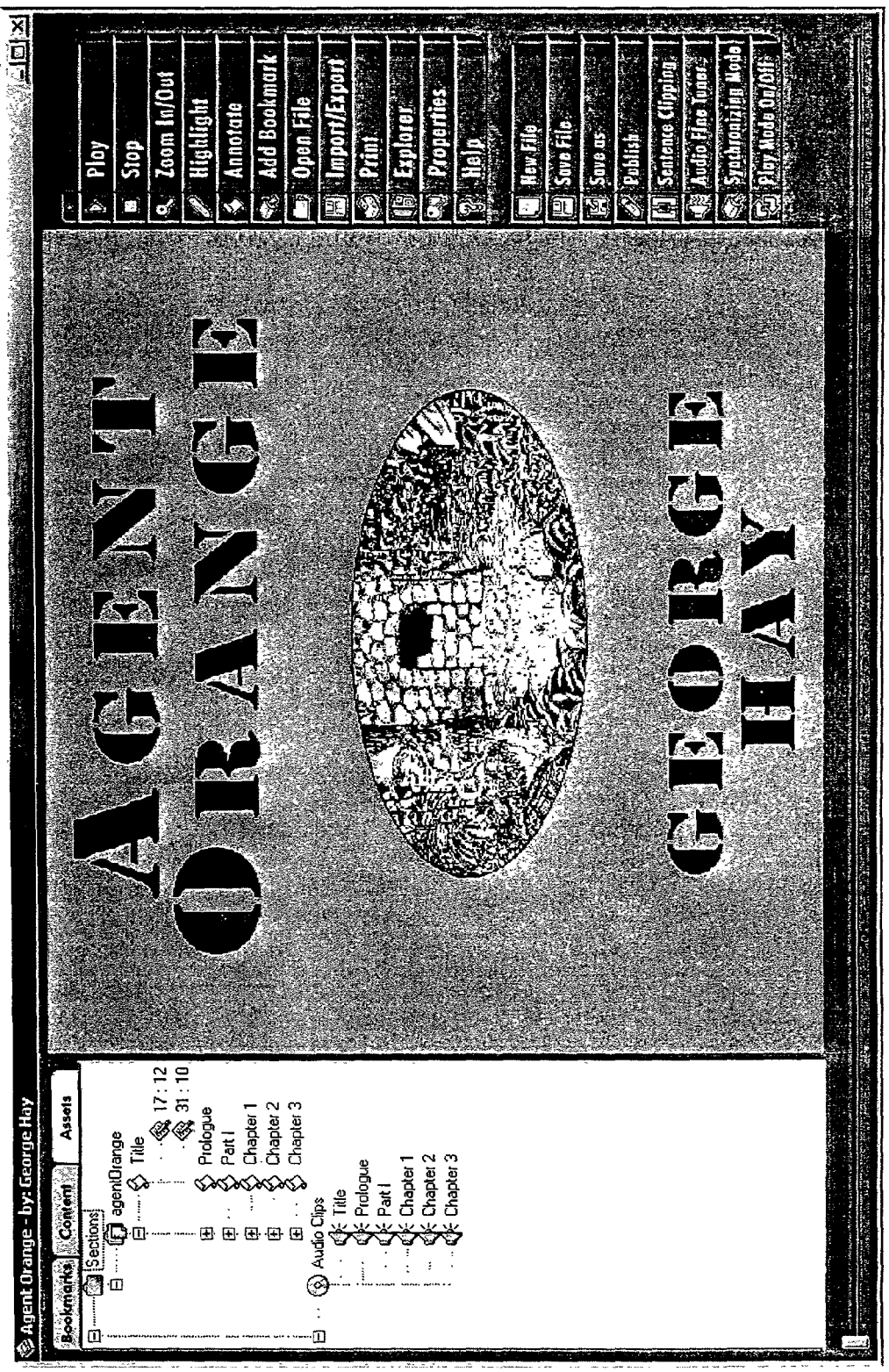
Figure 15:
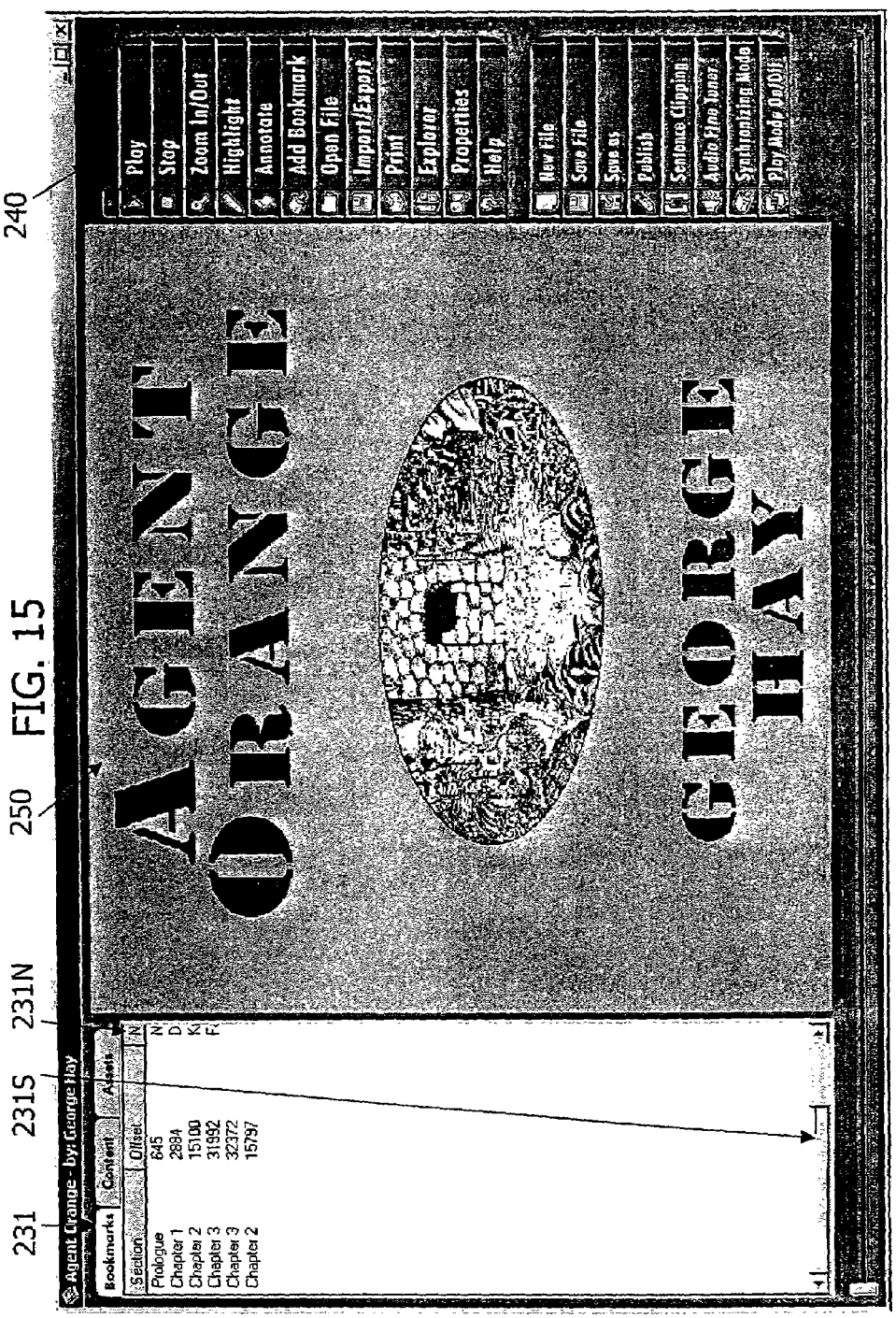

With reference to FIG. 11, upon double-clicking on the book entitled "Agent Orange" 212, for example, the book "Agent Orange" will be loaded into the system. For example, as shown in FIG. 12, an illustration of the front cover 220 of the book is preferably displayed to illustrate that the book is ready for reading and/or listening. FIG. 12 also shows an illustrative left side menu 230 and an illustrative right side menu 240 that may be included in some preferred embodiments of the invention. In the preferred embodiments, the left side menu 230 is used to identify and locate elements and/or locations within the book (e.g., for navigation purposes and the like), while the right side menu 240 is preferably used to provide a tool bar to launch functional attributes of the reader software. In some preferred embodiments, the left and/or right side menus may be minimized and/or have aspects thereof removed in some variations of these illustrative embodiments. Additionally, the locations of these menus and their interfaces can be varied in other embodiments. In the illustrated embodiment, the left side menu 230 includes tabs that may be used to display either "bookmarks" 231, "content" 232 and/or "assets" 233 associated with the book loaded into the reader. In FIG. 12, for example, the content 232 tab has been clicked and, thus, the content—Agent Orange—is shown. In FIG. 13, for example, the assets tab 233 has been clicked and, thus, the assets—e.g., the various text files, audio files and the like—associated with the book is shown. In FIG. 15, for example, the bookmarks tab 231 has been clicked and, thus, the bookmarks—e.g., including the "section" at which the bookmark is located and, if desired, a "note" associated therewith 231N can be included (note: in the illustrated, non-limiting embodiment, the word "Note" to the right of "Offset" can be viewed by clicking on a scroll bar 231S and dragging the same to the right). Preferably, under the word "Note," the user may insert a short "summary" or "heading" for the note and/or the first few words or characters in the note will be displayed there-under. Then, upon clicking on such words, a full pop-up window displaying the "note" will be presented to the user and/or the display within the text display region 250 will show that page associated with that bookmark.

Preferably, a user can initiate playing and/or reading of the narrated audio by clicking on the icon "play" in the right-side command menu 240. When this is done, playing and/or reading of the narrated audio will preferably commence on the particular location selected (e.g., which may be selected using a left side menu or the like). Preferably, if a user has loaded a particular book, upon clicking "play," the narration will commence at the beginning of the book—e.g., at the title.

Figure 14:
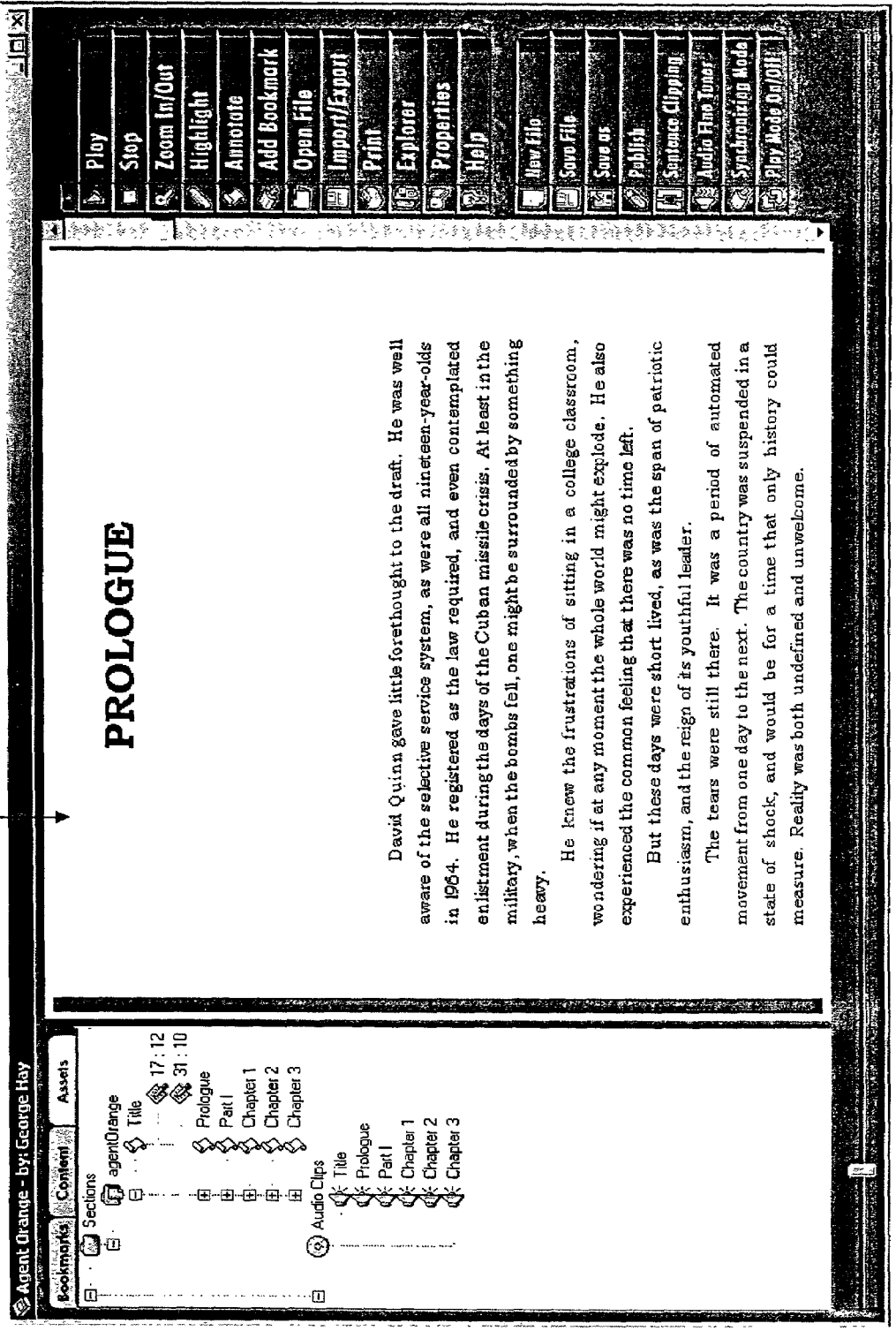

With reference to FIG. 14, when the narration is in a play mode, the corresponding text (e.g., text block) is preferably highlighted (e.g., such as the first sentence in the second paragraph being highlighted during the narration of the words "He knew . . . the whole world might explode" as shown). In some embodiments, if only a portion of a full-page of a book (e.g., such as in the example shown in FIG. 14) is displayed, the text will "automatically" pan or scroll upward as the text is read aloud (e.g., the text display is automatically scrolled along with the audio), while in more preferred embodiments the text position will remain fixed and a new image (e.g., a subsequent section of text) will be displayed once the highlighting reaches at or near the last line of text displayed.

Figure 16:
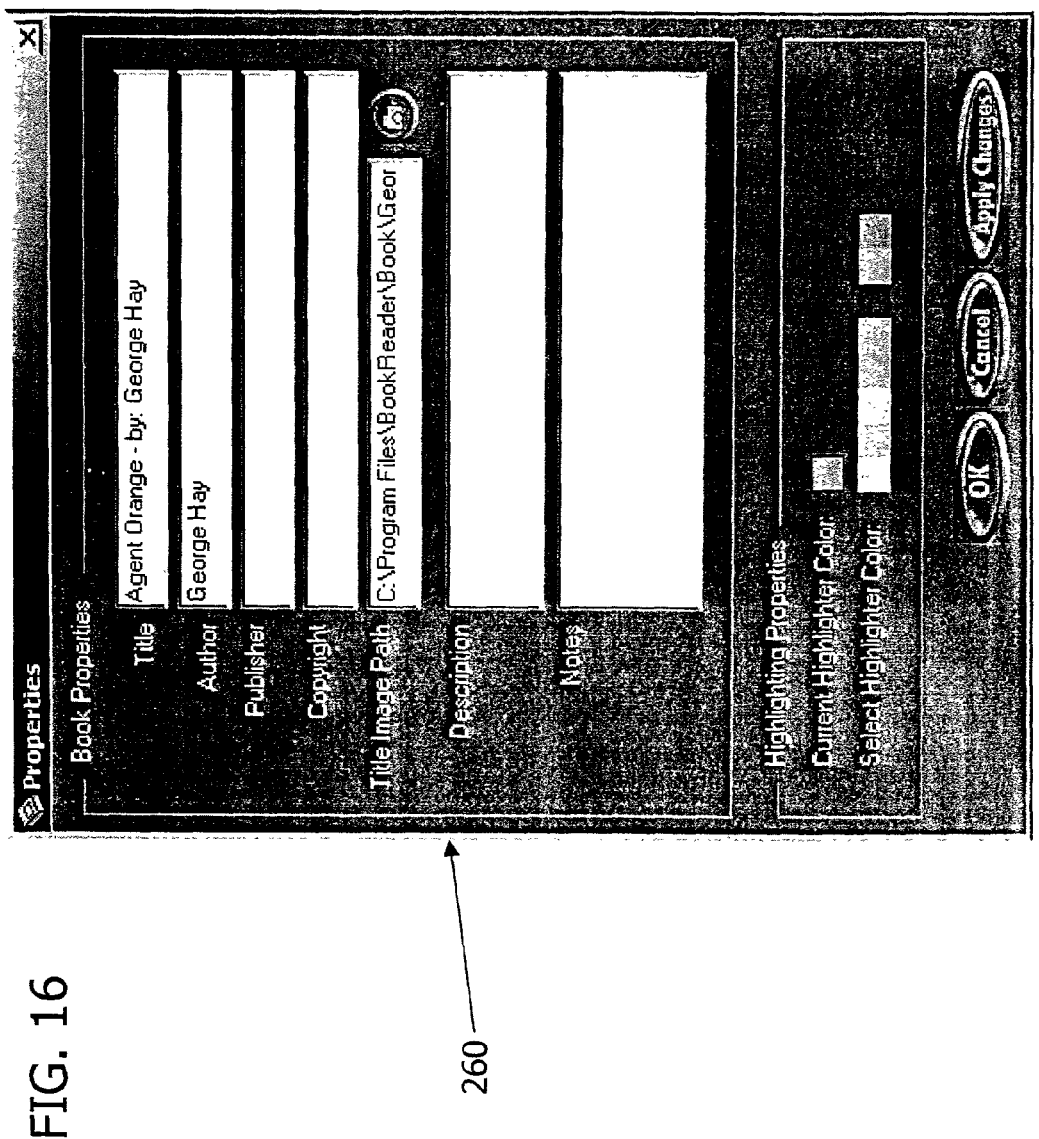

With reference to FIG. 16, an illustrative "properties" screen 260 is shown that can be used to save and/or show certain information related to a book. In the illustrated embodiment, the properties screen includes summary information about the book, including, e.g., title, author, publisher, copyright information and/or the like (e.g., preferably, this information is automatically populated upon loading of the book). In addition, the properties screen preferably includes means to select other properties, such as, for example, to select properties related to highlighting, bookmarks, annotations, particular users or the like. In the illustrated example, the properties screen can include means to select highlighting properties (e.g., such as color to be applied during highlighting). As shown, the properties screen also preferably includes regions for a user or users to insert descriptive information, notes or the like related to the book. Preferably, the properties screen information can also be pulled up or selected from the library mode without fully loading the respective book into the reader, such as, for example, by right clicking on the cover of a respective book. Preferably, a properties screen is retained for books within the library, even if such books are no longer or not stored in the storage of the computer or the like. In the latter case, a user may, for example, use the descriptive portion to identify the physical location of the book, if desired. In some preferred embodiments, the properties may also include the books ISBN number. Among other things, this ISBN number may potentially be used to "export" and/or "import" information. For example, in some embodiments, a user may potentially designate books within his or her library that are preferred or the like and the reader software may include a "query" function that may send a query via a communications link (e.g., via the Internet or the like) to a remote server that may return "further" selected readings, direct users to on-line book clubs (e.g., to other readers that have recently completed that book or the like) related to such books which may be facilitated by transmission of the respective ISBN numbers.

FIGS. 9A, 9B and 9C show some features that may be employed in some illustrative embodiments of the invention.

FIG. 9A shows alternative methods for displaying a book on a computer 30 via the reader software in other embodiments of the invention. As shown, the display may include a peripheral side edge region 310 (e.g., preferably displayed so as to provide a generally "3-dimensional" and/or "perspective" view of one or more edge of the book). The peripheral side edge view 310 preferably includes a view of one or more of the left side 310A, top side 310B and/or right side 310C edges of the book. Preferably, the dimensions of the side edges 310A, 310B and/or 310C are displayed proportional to the amount of pages in the book and proportional to the location of the displayed page or section. Accordingly, as a reader progresses in reading the edge 310A may increase in size while the edge 310C may decrease in size. In some preferred embodiments, the top edge 310B could include two halves that vary in size in parallel to the sizes of 310A and 310C (e.g., if displayed concurrently). In some preferred embodiments, a user may click on a region in the side edge 310 so as to "turn" the display to that location. In some preferred embodiments, when a cursor is placed over a side edge 310A, 310B and/or 310C, a corresponding page number will "pop-up" adjacent to the cursor to facilitate moving to a desired page in this manner.

In another variation of the latter embodiments, a user can preferably have bookmarks displayed as "POST-IT" like tabs 311 extending from the periphery of the book. In this manner, a user can readily visualize the bookmark placement. Preferably, the bookmarks can include short visible titles or indicia thereon and can be double-clicked to redirect to the corresponding page and/or to open a particular note or the like related thereto. These forms of "POST-IT" like tabs 311 can preferably be used with both annotations and/or bookmarks.

FIG. 9A also shows another optional aspect of preferred embodiments of the invention. In particular, FIG. 9A shows an optional two-page display format. In preferred embodiments, the display can show two-pages on the computer display 31. In the preferred embodiments, the gutter region 312 is provided with a separation line 313 between the pages simulating a physical book. Preferably, the separation line 313 includes a gradient-shaded area on left 313A and/or right 313B halves of the line 313. Preferably, the gradient is darkest proximate the center region as shown.

FIG. 9B illustrates a display of an unopened book that can be presented either in the library mode and/or on a display upon loading a particular book for reading and/or playing. As illustrated, a side edge 310 can be illustrated to "show" the respective size of the book (e.g., to facilitate browsing a library for a book of desired length) and/or to show placement of bookmarks 311, annotations, or the like. In some preferred embodiments, in order to enable users to gauge how many pages are contained in a book, rather than or in addition to showing the respective size of the book, an alpha-numeric display of the number of pages may be displayed proximate the book image (e.g., below a book cover image), may be displayed when a pointer is caused to move over an image of the book and/or may be otherwise displayed.

FIG. 9C schematically illustrates one feature that may be employed in preferred embodiments of the invention wherein subject matter contained within annotations and/or bookmarks and/or highlights of the book may be incorporated into a new file or document 320 for editing, printing, audio play-back and/or the like. Among other things, this feature can greatly facilitate the taking of notes in relation to educational materials and the like. In some preferred embodiments, one or more document 320 may be stored within a user's personal file (e.g., preferably contained within an XML format as discussed above).

Figure 17:
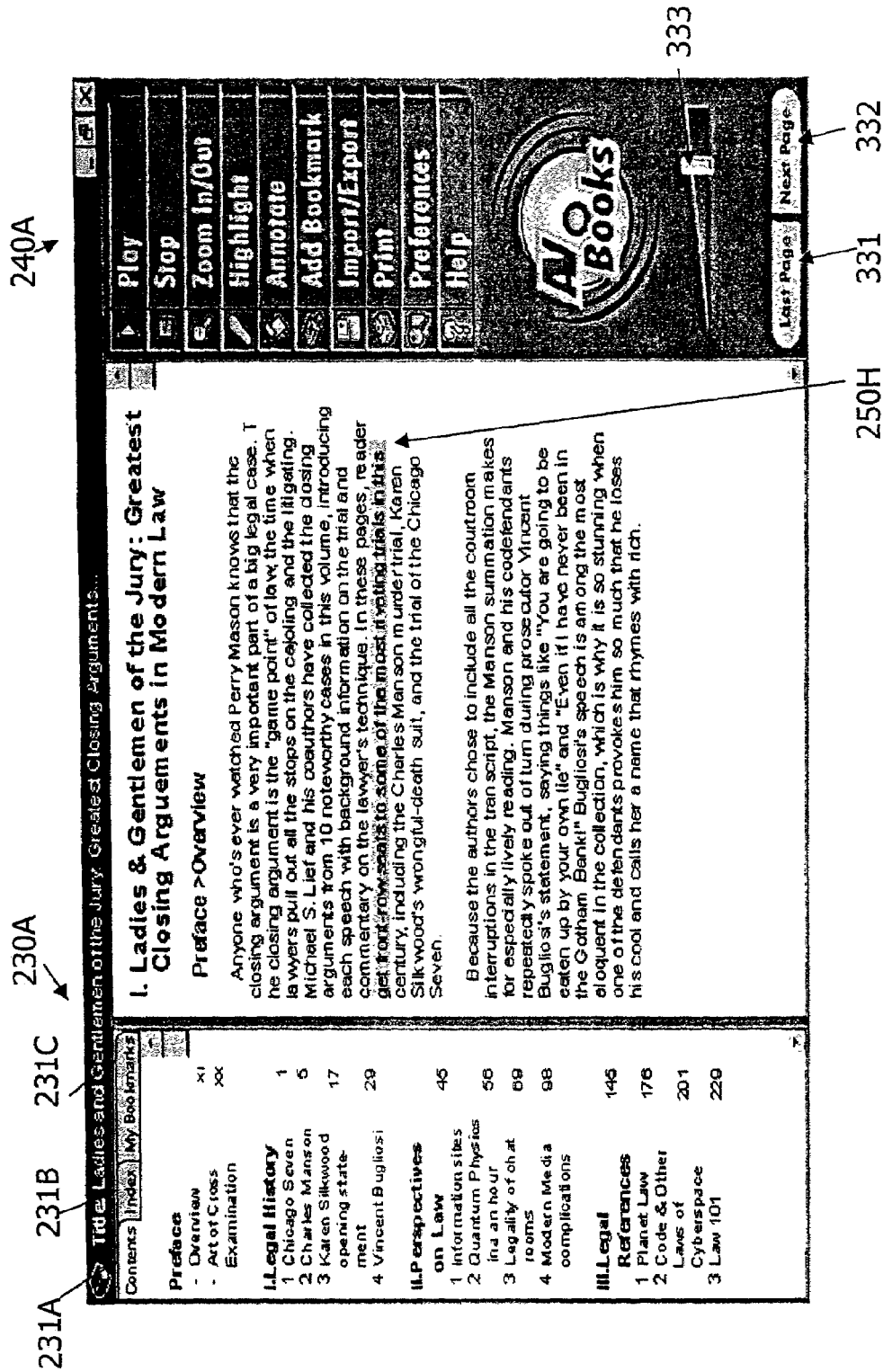

FIG. 17 illustrates another embodiment of an exemplary graphical user interface that can be provided by the reader program. In this illustrative embodiment, a left side menu 230A can be provided that includes, for example, tabs showing the "contents" (e.g., a table of contents as shown, preferably enables a user to link to respective sections by "clicking" thereon in the table of contents), an "index" (e.g., which may be, e.g., a copy of an index from within a text book or the like, and preferably also enables a user to link to respective sections by "clicking" thereon in the "index"), and/or "bookmarks" such as in embodiments described herein. In this illustrated embodiment, some or all of the following functionality can be enabled via respective icons or buttons in a right side command menu or the like: play; stop; zoom in; zoom out; highlight; annotate; add bookmark; import; export; print; preferences; and/or help. These functionalities may be adapted to operate in accordance with embodiments herein. As one example, a user may add highlighting to text which can subsequently be printed for the user via the "print" button. Among other things, this can facilitate the creation of personalized outlines. Moreover, various preferences of the user can also be created and displayed. Moreover, the user can also add bookmarks and/or annotations to a book section (along with notes) as desired.

FIG. 17 also illustrates exemplary navigation means, including, e.g., a last page button 331 to move back to a previous page and a next page button 332 to move forward to a next page. In some preferred embodiments, a user may go "fast backwards" or "fast forwards" by single-clicking on either of these buttons for an extended period of time and releasing the "clicked" state to cause to application to stop at a certain page. Additionally, FIG. 17 illustrates an optional volume control interface 333 wherein a user can preferably click on a displayed knob and drag the same to the left to decrease volume or to the right to increase volume of the narrated audio. FIG. 17 also illustrates an alternative, although less preferred, method of highlighting, wherein a single line of text 250H from which the narration is concurrently read is "highlighted" at a given time.

Figure 18:
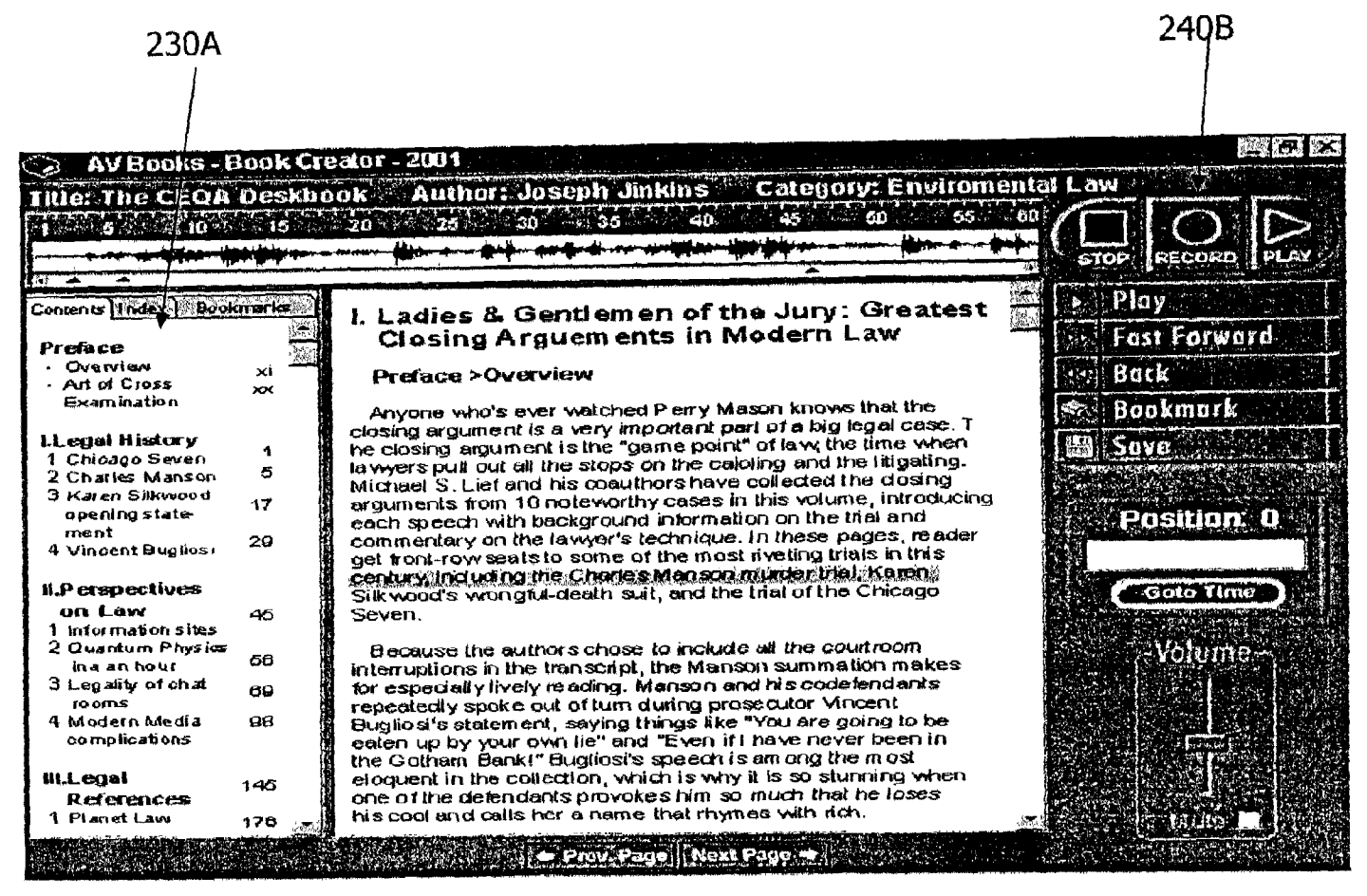

FIG. 18 illustrates another embodiment of an exemplary graphical user interface that can be provided by the reader program. In this illustrative embodiment, a left side menu 230A can be provided that is generally similar to that shown in FIG. 17. In this illustrative embodiment, a right side command menu can be provided that includes one or more of the following functionalities: play; fast forward; fast backward; bookmark; and/or save. The "save" function can be used for example to save a personal file containing bookmarks or the like (e.g., preferably, a user can select a particular file and/or directory for such to be saved, such as to a computer's hard drive, to a floppy disk or to another suitable location). FIG. 18 also illustrates another "navigation" means that may be employed, which can include a field within which to insert a desired position to navigate to (e.g., by either inserting a page or the like text position and/or a time or the like audio position). FIG. 18 also illustrates another interface means for the adjustment of playback volume. Additionally, FIG. 18 illustrates the use of a interface to control muting of the audio when desired. FIG. 18 also illustrates an alternative location for previous page and/or next page icons or buttons that have some ergonomic and/or ease of use advantages.

FIG. 18 also illustrates another aspect of some preferred embodiments of the invention, wherein a user can include audio notes along with a bookmark and/or annotation function. As shown, FIG. 18 includes icons or buttons "stop," "record," and "play" that can be used to insert verbal comments along with a bookmark, annotation or the like. In this manner, the GUI enables not only the ability to playback information, but the user can also record information and thereby have voice inserts at various points in the text of the book being read. This will allow, for example, a student to put in his own commentary and/or to insert commentary from another individual such as the instructor or another individual into the text of a book based on lecture notes or the like. In preferred embodiments, any such insert may be keyed to the appropriate passage in the book and may be played back to the user when desired (e.g., by double clicking on the respective bookmark or the like).

Figure 19:
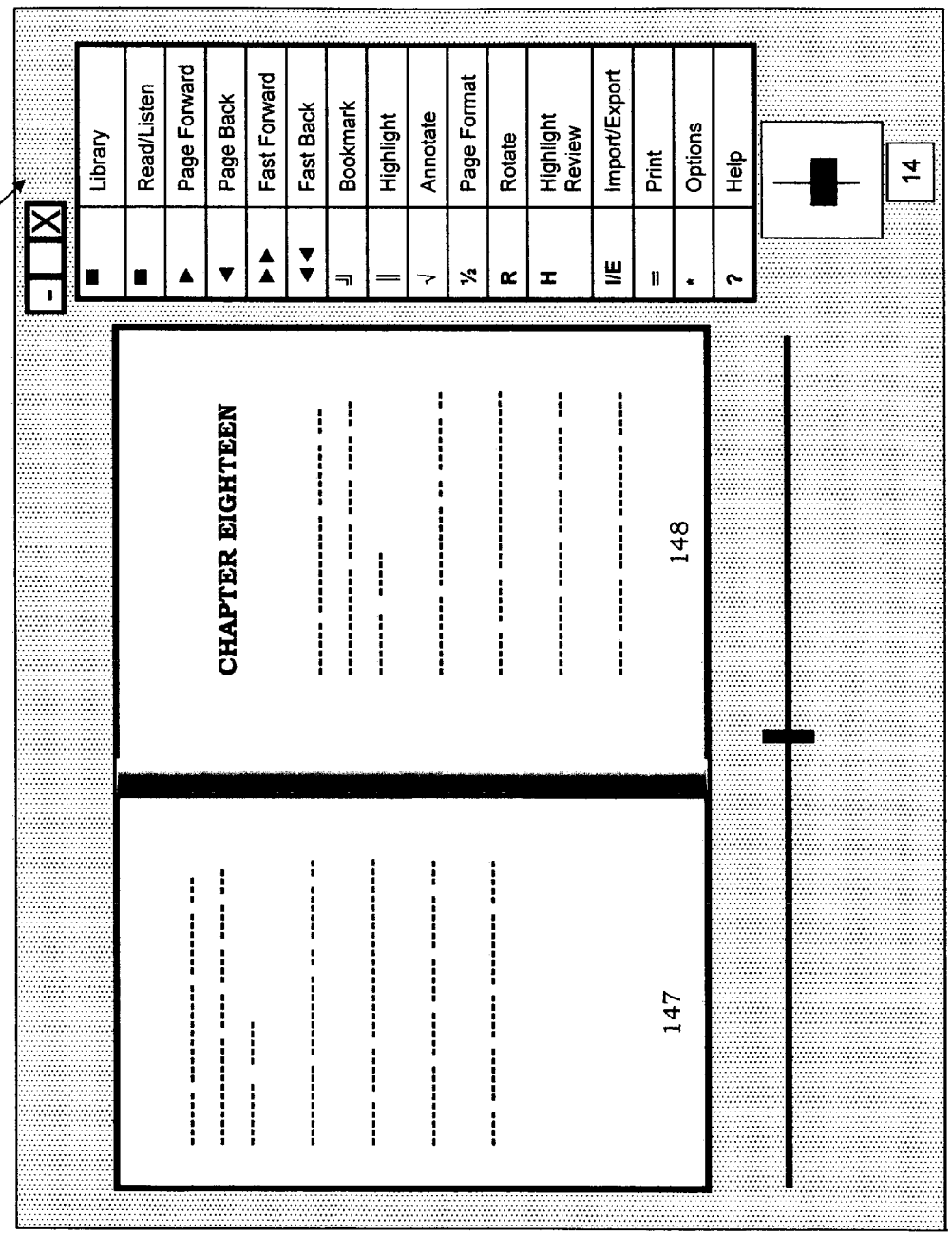

FIG. 19 illustrates another embodiment of an exemplary graphical user interface that can be provided by the reader program. In this illustrative embodiment, a two-page display of the text is provided. Most preferably, the entire two pages can be displayed at a single time, and the corresponding portion of the spoken text can be highlighted in turn without altering the position of the viewed text until the page is actually turned (i.e., maintaining the text at a fixed position in this manner can facilitate reading in either the single or two page modes). In cases where only a portion of a vertical page can be displayed at a time, the text preferably is not "scrolled" line-by-line, but preferably moved in part-page increments or the like (e.g., when the last line of a top half of a page is displayed, the bottom half can then be displayed, as opposed to scrolling the text).

FIG. 19 illustrates preferred functionality that can be employed in some exemplary embodiments of the reader program, including, for example: a library icon or button (e.g., that brings up a display of the existing library contents such as described herein); a read/listen button (e.g., that enables a user to switch between reading and/or listening; in this regard, a user may, e.g., click read/listen once to turn the audio on and click read/listen again to turn the audio off); a page forward icon; a page backward icon; a fast forward icon; a fast backward icon; a bookmark icon (e.g., which may enable bookmarking along the lines of any of the embodiments herein); a highlight icon (e.g., which may enable highlighting along the lines of any of the embodiments herein); an annotate icon (e.g., which may enable annotating along the lines of any of the embodiments herein); a page format icon (e.g., which may for example enable a user to switch between a two-page display and a single page display and/or to otherwise alter the page, such as the font size, etc., of the display); a rotate icon (e.g., which may be used to rotate a page displayed, such as, for example, for viewing purposes, printing purposes or the like); a highlight review icon (e.g., which may display all of the highlighted portions aside from the text to facilitate review, as well as potentially saving the same in a personal file that may be edited as desired); an import/export function (e.g., which will preferably enable, for example, importing and/or exporting of a user's personal file and/or information, such as highlighting, bookmarks, annotations or the like); a print icon (e.g., that will enable a user to print one or more pages of the book, a screen-display, the contents of a user's personal file or other aspect, as desired); an options icon (e.g., that will enable a user to select options, such as in accordance with any of the embodiments herein); and/or a help icon (e.g., that will bring up a "how to" book to help a user with the operation and use of the reader software). FIG.

19 also illustrates another exemplary navigation means by which a user can move to and/or select a particular page or location for reading and/or listening similar to that shown in FIGS. 12 through 15 which includes a knob displayed along a line that extends substantially across the bottom of the displayed page(s). Preferably, a user can click a pointer on the knob and drag the same left and/or right to a particular page as desired. Preferably, a window (e.g., which may be a pop-up window adjacent the knob) is provided that provides the alpha-numeric indication of the particular page number at which the knob is located. Among other things, providing a longer line that extends across a substantial portion of the width of the computer display can facilitate recognition of one's current placement within the text (e.g., since the knob display will preferably move there-along based on the user's page location) and/or facilitate manual navigation to a desired page using manually manipulated pointers to move the knob along the line (e.g., especially where a book has numerous pages and, thus, small increments in knob position may significantly effect page location).

As discussed above, in some embodiments of the invention, additional measures can be employed to protect the audio-visual books from unauthorized copying and/or use.

For example, technology similar to that used with respect to MICROSOFT'S OFFICE XP products can be employed. For example, the computer readable media products can contain software-based product activation technology, wherein a user needs to activate a computer readable media product in order to use it (e.g., such activation being enabled by an external source to facilitate monitoring the product). In some embodiments where users license products through licensing agreement programs, users may not be required to activate their products because this can be done by the system's administrator during deployment. In illustrative embodiments, product activation works by verifying that a software program's product key, which must be used in order to install the product, has not been used on more personal computers than intended by the software's license. For example, a user can use a software activation wizard that enables the user to provide the user's product ID to the product company either over the Internet (e.g., through a secure transfer) or by telephone. The installation ID can then be sent back to the user's machine to activate the product. Additionally, as with the foregoing MICROSOFT product, an audio-visual book may be enabled with a predetermined number of grace launches before the user must activate the book. If the user does not activate within such number of launches, the product can go into a reduced-functionality or non-functionality mode. For example, in a reduced-functionality mode, a user may be able to hear and/or view the table of contents or other limited portions of the book. When a program is in reduced functionality mode, a user can preferably still activate it to enable its full functionality.

During Internet activation, for example, an activation wizard will preferably automatically detect an Internet connection and connect to a secure server to transfer an installation ID. Preferably, little or no user information is required. However, in some embodiments, a user may opt to provide personal information for registration purposes and to receive personalized information, product offers, etc. Preferably, a confirmation ID is passed back to the user's personal computer, automatically activating the application. During oral communication activation (e.g., over the telephone), a customer service representative can ask for an installation ID number displayed on the same screen, enter that number into a secure database, and return a confirmation ID to the user. Then, the user can type in that confirmation ID and the activation process is complete. Preferably, the installation ID includes an encrypted form of the product key and a hardware identifier. As a result, if a user significantly alters the user's personal computer by replacing a substantial number of hardware components, the user may have to re-activate the product. Preferably, activation data is stored in a secure facility.

In preferred embodiments, the reader software contained on the computer readable medium can be installed at any time, even in circumstances wherein a product is not activated. This may, among other things, facilitate the dissemination of the reader software. In the preferred embodiments, each computer readable medium will have a book with a respective unique ID.

In some embodiments, other copy limiting techniques can be used. For example, a computer readable medium can be distributed with an ID code that must be entered to install the programming. The code can, for example, be printed on a container for the media. As another example, the media may be adapted to provide the appearance that the size of the file containing the respective work is too large for downloading. Any other copy and/or access limiting techniques now known or later known can be utilized in various embodiments of the invention.

In some preferred embodiments, each computer readable medium contains a single book. However, the various embodiments can be modified such that a single medium (or, less preferably, a plurality of media) may contain a plurality of books or literary works (e.g., a compilation of works [e.g., by author, category, genre or the like]).

In some embodiments, computer readable media according to the present invention can be used to distribute a plurality of works on a medium. In some embodiments, a "Publisher's Clearing House" type of application can be employed, wherein a plurality of magazines, books and/or other literary works are provided to customers, but via computer readable media according to embodiments of the present invention. The works may be purchased and/or ordered by the customer via a submission form or the like in which the user selects works that can be, e.g., packaged together and included on such media. Similarly, the present technology can be used to deliver subscription issues in a multiple format (e.g., as available via, e.g., PUBLISHER'S CLEARING HOUSE) and/or on a small or single product subscription basis. Thus, for such subscriptions, periodic, such as monthly, computer readable media can be distributed. This may facilitate distribution of works and especially the distribution of multiple works from a single originating source.

While illustrative embodiments of the invention have been described herein, it will be appreciated that the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The appended claims are to be interpreted broadly based the language employed in the claims and not improperly limited to illustrative examples described in the present specification or in the prosecution of the application. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) no structure, material or acts are recited in support of that function.

What is claimed is:

1. A computer-readable-medium-electronic-book assembly, comprising:
    a) a portable physical container for housing a computer readable medium;
    b) a pre-recorded audio narration file of substantially an entire book stored on a single computer readable medium;
    c) an electronic text file of substantially the entire book stored on said computer readable medium;
    d) a synchronization file linking time signatures of the pre-recorded audio narration with locations in the electronic text stored on said computer readable medium;
    e) a reader program adapted to cause a computer to display text of the book, to play the pre-recorded audio narration of the book, and to allow a user to link there-between as desired using the linking file stored on said computer readable medium;
    f) an automatic installation program to automatically install the reader software upon placement of the computer readable medium within a computer stored on said computer readable medium;
    g) said container housing said computer readable medium, said container having a picture that is visible from a front surface thereof that is substantially the same as that on a hard-cover copy of the book, and having a spine from which is visible a title of the book and/or the author's name;
    h) wherein said pre-recorded audio narration has a recorded audio narration of an actual human voice;
    i) wherein said reader program is configured such that when the pre-recorded audio narration is played, a corresponding page of text is concurrently displayed in a fixed non-scrolling condition;
    j) wherein said reader program is configured such that when the pre-recorded audio narration of the book is played and said corresponding page of text is concurrently displayed in said fixed non-scrolling condition, a corresponding segment of the text for which the pre-recorded audio narration is concurrently played is highlighted in such a manner that the highlighting moves downward along the corresponding fixed non-scrolling page of text as the audio narration of an actual human voice is played;
    k) wherein said reader program is configured such that upon the pre-recorded audio narration of the book and the highlighting reaching at or near a last line of text displayed, the display is changed such that a subsequent page of text will be displayed and the highlighted text will commence proximate an upper portion of the subsequent page of newly displayed text;
    l) wherein said reader program is configured such that a two-page display of text can be presented with two pages in a side-by-side relationship, and wherein when the pre-recorded audio narration of the book is played, a corresponding segment of the text for which the pre-recorded audio narration is concurrently played is highlighted in such a manner that the highlighting moves downward along the corresponding page of text as the audio narration is played first from a top to a bottom of the left-side page and then from a top to a bottom of the right-side page, and wherein the two-page display is then changed such that a new two-page display of text is presented;
    m) wherein said reader program is configured to present said two-page display in a manner to be similar to an open book with a gutter graphically displayed in a middle between said two pages to simulate a physical book;
    n) wherein said reader software is adapted to concurrently display an image of a book with two peripheral side edge region (310A and 310C) located on left and right sides of the book substantially parallel to said gutter to further simulate side edges of pages in a physical book;
    o) wherein said computer readable medium is a single CD;
    p) wherein said reader program is adapted to create a personal file that contains personal information related to a user;
    g) wherein said personal file includes information related to bookmarks;
    r) wherein said reader software is adapted to enable the personal file to be saved to a digital data storage device;
    s) wherein said reader software is adapted to create a library of electronic books, wherein said library includes electronic books stored on a particular computer or electronic books that are not stored on the computer but that may be accessible to a user.

2. The assembly of claim 1, wherein said audio is contained within an MP3 compression format.

3. The assembly of claim 2, wherein said text is in an RTF format.

4. The assembly of claim 3, wherein said linking file is an XML file.

5. The assembly of claim 1, wherein said reader program is adapted to create a personal XML file that contains personal information related to a user.

6. The assembly of claim 5, wherein said personal XML file includes information related to bookmarks.

7. The assembly of claim 5, wherein said personal file includes information related to annotations.

8. The assembly of claim 5, wherein said personal file includes information related to highlighting.

9. The assembly of claim 5, wherein said reader software is adapted to save the personal file to a digital data storage device.

10. The assembly of claim 5, wherein said reader software is adapted to save the personal file upon the computer readable medium.

11. The assembly of claim 1, wherein said computer readable medium includes only read-only memory.

12. The assembly of claim 1, wherein at least said audio and text portions of said computer readable medium are contained within read-only memory.

13. The assembly of claim 1, wherein said computer readable medium includes portions that are write-able.

14. The assembly of claim 13, wherein the reader software is adapted to create a personal file and to save the same in said write-able portion of said computer readable medium, wherein said personal file includes bookmarks and/or annotations.

15. The assembly of claim 1, wherein said audio and text portions are adapted such as to prevent copying thereof.

16. The assembly of claim 1, wherein said container is dimensioned such that a height and front-width are substantially the same as that of a standard paper-back book.

17. The assembly of claim 1, wherein said container is dimensioned such that it has a height of between about 6 and 9 includes and a front-width of between about 4 and 6 inches.

18. The assembly of claim 1, wherein said reader software is adapted to create a library, wherein said library includes electronic books stored on a particular computer and electronic books that are not stored on the computer but that are accessible to a user.

19. A method of creating the assembly of claim 1, comprising:
- a) obtaining a raw audio recording file of a human narration of a book;
- b) audio editing the audio file;
- c) segmenting the audio file;
- d) converting the segmented files into a compressed format;
- e) obtaining an electronic format text version of said book;
- f) separating the text version of the book into multiple documents;
- g) using a creator program at an editor's station: playing the audio obtained in step e); concurrently viewing text obtained in step g); creating a synchronization file linking the audio and text files;
- h) publishing the audio files from step d) for said prerecorded audio narration file, the electronic text documents of step f) for said electronic text file, the synchronization file of step g) for said synchronization file, said reader program and said automatic installation program to said computer readable medium so as to create a computer-readable-medium-electronic-book.

20. The assembly of claim 1, wherein said computer readable medium contains a plurality of literary works that are distributed together on the medium.

21. The assembly of claim 1, further including means for presenting promotional information or advertisements.

22. The assembly of claim 1, further including means for downloading copies, versions or upgrades of software via the Internet or another public network.

23. The assembly of claim 1, further including at least one video clip on said computer readable medium.

24. The assembly of claim 1, wherein one or more aspect of audio sounds are maintained separately from a narrator's voice such that during use, at least some of the background sounds may be managed separately from the narrator's voice.

* * * * *